United States Patent
Tadanobu et al.

(10) Patent No.: US 6,680,841 B2
(45) Date of Patent: Jan. 20, 2004

(54) SOLID ELECTROLYTIC CAPACITOR AND ITS MANUFACTURING METHOD

(75) Inventors: Kazuo Tadanobu, Kyoto (JP); Takuhisa Sugimoto, Kyoto (JP); Yukihiro Take, Kyoto (JP); Itsuo Kojima, Kyoto (JP); Kazuya Kawahara, Kyoto (JP); Masatoshi Tasei, Kyoto (JP); Masahiro Yabushita, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/207,378

(22) Filed: Jul. 30, 2002

(65) Prior Publication Data

US 2003/0039093 A1 Feb. 27, 2003

(30) Foreign Application Priority Data

Jul. 30, 2001 (JP) ........................ 2001-229189
Dec. 14, 2001 (JP) ........................ 2001-381342

(51) Int. Cl.$^7$ ................................. H01G 9/00
(52) U.S. Cl. .................. 361/523; 361/502; 361/503; 361/525; 361/528; 29/25.03
(58) Field of Search ................ 361/502, 512, 361/523, 528, 508, 516, 503, 510, 525, 531, 534, 540, 541; 29/25.03

(56) References Cited

U.S. PATENT DOCUMENTS

| | | | | |
|---|---|---|---|---|
| 4,959,754 A | * | 9/1990 | Stüfler et al. | |
| 5,422,782 A | * | 6/1995 | Hernandez et al. | |
| 5,660,737 A | * | 8/1997 | Elias et al. | |
| 6,081,418 A | * | 6/2000 | Kuranuki et al. | |
| 6,118,651 A | * | 9/2000 | Mehrotra et al. | |
| 6,152,970 A | * | 11/2000 | Wei et al. | |
| 2002/0141141 A1 | * | 10/2002 | Mitoh et al. | |

FOREIGN PATENT DOCUMENTS

| | | |
|---|---|---|
| JP | 4-243116 | 8/1992 |
| JP | 2000-138138 | 5/2000 |

* cited by examiner

Primary Examiner—Dean A. Reichard
Assistant Examiner—Nguyen T. Ha
(74) Attorney, Agent, or Firm—McDermott, Will & Emery

(57) ABSTRACT

A disclosure is made on a solid electrolytic capacitor, which facilitates an assembly work with simple construction to lead to a reduction of cost, realizes excellent equivalent series resistance characteristics and makes a thin configuration possible, and a manufacturing method thereof. With the solid electrolytic capacitor of the present invention, a cathode lead frame has a connecting member to connect integrally with a cathode member of a capacitor element stack body on the side surface of a capacitor element extending in the thickness direction thereof. Capacitor elements, each provided with a through hole on an anode member, are stacked on top of each other in layers and connections between capacitor elements are achieved by disposing an anode lead frame between layers. Accordingly, when a plurality of anode members are joined to the anode lead frame via a through hole provided on respective anode members of capacitor elements, stabilized welding work is allowed to be performed without any of molten aluminum foil to be released outside.

21 Claims, 18 Drawing Sheets

SOLID ELECTROLYTIC CAPACITOR AND ITS MANUFACTURING METHOD

TECHNICAL FIELD

The present invention relates to a solid electrolytic capacitor used in a variety of electronic equipment and a manufacturing method thereof.

BACKGROUND ART

FIG. 30 is a perspective view showing the structure of a prior art solid electrolytic capacitor and FIG. 31 is a perspective view showing the structure of a solid electrolytic capacitor element stack unit. In FIG. 30 and FIG. 31, capacitor element 50 is an anode body composed of aluminum foil, the aluminum being a valve action metal, and divided into anode member 50A and cathode member 50B. Further, cathode member 50B has a dielectric oxide film layer, solid electrolyte layer and cathode layer (none of these are shown in the drawings) stacked on top of each other in layers on the surface thereof in succession.

Capacitor element stack unit 51 is constructed as described below:

1A) A conductive silver paste (not shown in drawings) is applied onto cathode unit terminal 52 to join with cathode member 50B.

2A) Cathode member 50B of another capacitor element is joined with cathode member 50B by applying a conductive silver paste (not shown in the drawings) thereto.

3A) By repeating the steps 1) and 2) by a plurality of times, a plurality of capacitor elements 50 are stacked on top of each other in layers.

4A) Then, respective anode members 50A of the plurality of capacitor elements 50 are integrally connected with anode unit terminal 53.

By using capacitor element stack unit 51 thus prepared, a solid electrolytic capacitor is constructed as follows:

5A) Cathode member 50B of capacitor element stack unit 51 is joined onto cathode lead frame 54 via a conductive silver paste (not shown in the drawings).

6A) Another capacitor element stack unit 51 is stacked on cathode member 50B via a conductive silver paste (not shown in the drawings).

7A) By repeating the steps 5) and 6) by a plurality of times, a plurality of capacitor element stack units 51 are stacked on top of each other in piles.

8A) Respective anode members 50A of the plurality of capacitor element stack units 51 are integrally connected with anode lead frame 55.

9A) The plurality of capacitor element stack units 51 are encapsulated with an insulating packaging resin (not shown in the drawings) in such a way as part of respective anode lead frame 55 and cathode lead frame 54 is exposed on the outer surfaces of the insulating packaging resin.

FIG. 32 is a cross-sectional view of another prior art solid electrolytic capacitor structured differently from the one shown in FIG. 30. FIG. 33 is a perspective view of a capacitor element used in the solid electrolytic capacitor of FIG. 32, and FIG. 34 is a perspective view showing how a plurality of the capacitor elements are stacked on top of each other in layers on anode/cathode lead frames.

In FIG. 32 to FIG. 34, capacitor element 56 is an anode body formed of aluminum foil (not shown in the drawings), the aluminum being a valve action metal, and divided into anode member 59 and cathode member 60 by providing resist part 58 after a dielectric oxide film layer (not shown in the drawings) is formed on the surface of the anode body. Further, a solid electrolyte layer and cathode layer (none of these are shown in the drawings) are stacked on top of each other in layers on the surface of cathode member 60 in succession.

A capacitor element stack body of FIG. 34 is constructed as described below:

1B) A plurality of capacitor elements 56 are stacked on top of each other in layers in such a way as having anode member 59 disposed on both upper and bottom surfaces of anode lead frame 61 and also having cathode member 60 disposed on both upper and bottom surfaces of cathode lead frame 62.

2B) Respective anode members 59 are joined integrally with anode lead frame 61 by resistance welding.

3B) Respective cathode members 60 are connected integrally to connecting member 62A provided on cathode lead frame 62 on the side surfaces of capacitor element 56 extending in the thickness direction thereof via a conductive silver paste (not shown in the drawings).

Additionally, connecting member 62A is armed by bending part of a flat member of cathode lead frame 62 into a right angle.

By using the capacitor element stack body of FIG. 34 thus prepared, the solid electrolytic capacitor of FIG. 32 is constructed as follows:

1C) The capacitor element stack body is encapsulated with an insulating packaging resin 63 in such a way as part of respective anode lead frame 61 and cathode lead frame 62 is exposed on the outer surfaces of packaging resin 63.

2C) Anode lead frame 61 and cathode lead frame 62 exposed from packaging resin 63 are respectively bent along the surface of packaging resin 63. (This is not shown in the drawings.)

The solid electrolytic capacitor shown in FIG. 30 is prepared by first producing capacitor element stack unit 51 by stacking a plurality of capacitor elements 50 on top of each other in layers and then by further stacking a plurality of capacitor element stack units 51 on top of each other in piles. Accordingly, not only a great variety of component parts are used but also the assembly work becomes complex, thereby ending up with a high cost product.

As described in above, by applying a conductive silver paste onto respective stack surfaces of a plurality of capacitor elements 50, capacitor elements 50 are connected with one another electrically to construct capacitor element stack unit 51. Furthermore, a plurality of capacitor element stack units 51 are stacked on top of each other in piles with a conductive silver paste applied therebetween to connect electrically between capacitor element stack units 51. Finally, part of cathode lead frame 54 located on the bottom of the stack of capacitor element stack units 51 forms a cathode terminal for external connection, thereby making it difficult for equivalent series resistance (referred to as ESR on occasions, hereafter) characteristics to be made closer to theoretical ones since the distance of cathode lead tends to be long.

The ESR characteristics of the setup as described in above are demonstrated by a summation of the following resistance values as shown in a schematic illustration of FIG. 35:

A) Resistance R1 produced between the layers of capacitor element 50 that constitute capacitor element stack unit 51.

B) Resistance R2 produced between the piles of capacitor element stack unit 51.

Therefore, as the number of layers of capacitor element 50 and the number of piles of capacitor element stack unit 51 increase, an alienation between actual ESR characteristics and theoretical ones is growing.

Additionally, since there exists a conductive silver paste between respective neighboring capacitor elements 50 and also between respective neighboring capacitor element stack units 51, the dimensions in the height direction thereof become large, thereby making it difficult for the end product of solid electrolytic capacitor to be reduced in thickness.

With the solid electrolytic capacitor of FIG. 32, a plurality of anode members 59, each provided to capacitor element 56, are integrally joined to anode lead frame 61 by resistance welding as described in above. However, as FIG. 36 shows, dielectric oxide film layer 56B is formed on the surface of aluminum foil 56A in anode member 59. When anode member 59 is joined to copper made anode lead frame 61 by resistance welding, dielectric oxide film layer 56B having a high value in resistance makes it hard for the welding currents to flow. As a result, only part of aluminum foil 56A is welded onto anode lead frame 61 or aluminum foil 56A is not welded onto anode lead frame 61 at all in the bad case. Therefore, not only defective capacitors due to insufficient welding strength are produced but also an increase or a wide range of variation in equivalent series resistance may be caused.

In order to solve the foregoing problems, an increase of welding currents or the adoption of laser welding is well worth considering. However, such countermeasures as above may cause new problems as follows:

Molten aluminum foil 56A may extend to such places as cut sections of anode member 59 and the like, where aluminum foil 56A is exposed, or may be splashed to impair an outward appearance. The thickness of packaging resin 63 is reduced by a comparable amount of molten aluminum foil 56A, thereby causing such problems as a reduction in hermeticity. A short circuit occurs, and the like.

On the other hand, since the thickness of anode member 59 is less than the thickness of cathode member 60, a gap is created between neighboring anode members 59 when capacitor elements 56 are stacked on top of each other in layers. When respective anode members 59 are integrally joined onto anode lead frame 61 by resistance welding, a pressing force is applied via welding electrode 64 to crush the aforementioned gap. At this time, anode member 59 is bent and the extent of bending of anode member 59 is more pronounced as the distance of anode member 59 from anode lead frame 61 increases. Therefore, an excessive deformation of anode member 59 due to the bending results in cracks created in part of dielectric oxide film layer 56B or sometimes in a breakage thereof, thus causing a leakage current (LC) failure.

SUMMARY OF THE INVENTION

With a solid electrolytic capacitor of the present invention, an anode lead frame is connected to anode members of a capacitor element stack body which is formed by stacking a plurality of capacitor elements on top of each other in layers while a cathode lead frame has a connecting member to connect integrally with cathode members of the capacitor element stack body on the side surface thereof extending in the thickness direction of the capacitor element, thereby allowing a reduction in component count and enhancement of productivity in assembly work to be realized with a simplified structure. Moreover, since a cathode is taken from the side surface of the cathode member of the capacitor element, the distance of a cathode lead is shortened, resulting in a remarkable improvement in equivalent series resistance characteristics. Furthermore, no conductive silver paste is disposed between neighboring stack layers, thereby allowing the thickness of the capacitor to be reduced.

Further, with the solid electrolytic capacitor of the present invention, capacitor elements, each anode member of which has a through hole, are stacked on top of each other in layers and an anode lead frame is connected with stacked capacitor elements. Accordingly, when a plurality of anode members are joined onto the anode lead frame via the through hole provided on the anode member of each respective capacitor element, a stabilized welding work is allowed to be conducted without such problems as splashing of molten aluminum foil and the like. Also, an excellent joining strength, enhanced reliability and a remarkable improvement in equivalent series resistance are achieved.

BEST MODE FOR CARRYING OUT THE INVENTION

Next, a description is given to various exemplary embodiments of the present invention with reference to drawings. With respect to a description made on objects structured in a manner similar to one another, the same reference symbols are used in common.

Exemplary Embodiment 1

Figure 1:
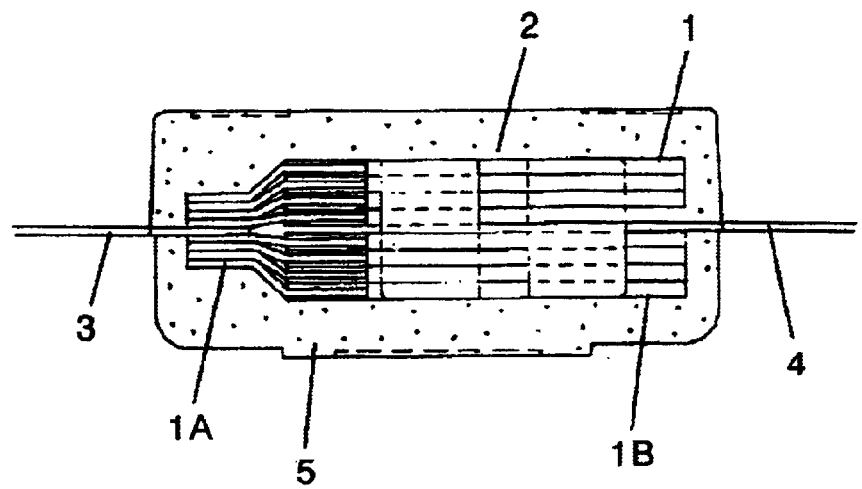
FIG. 1 is a cross-sectional view showing the structure of a solid electrolytic capacitor in exemplary embodiment 1 of the present invention.
Figure 2:
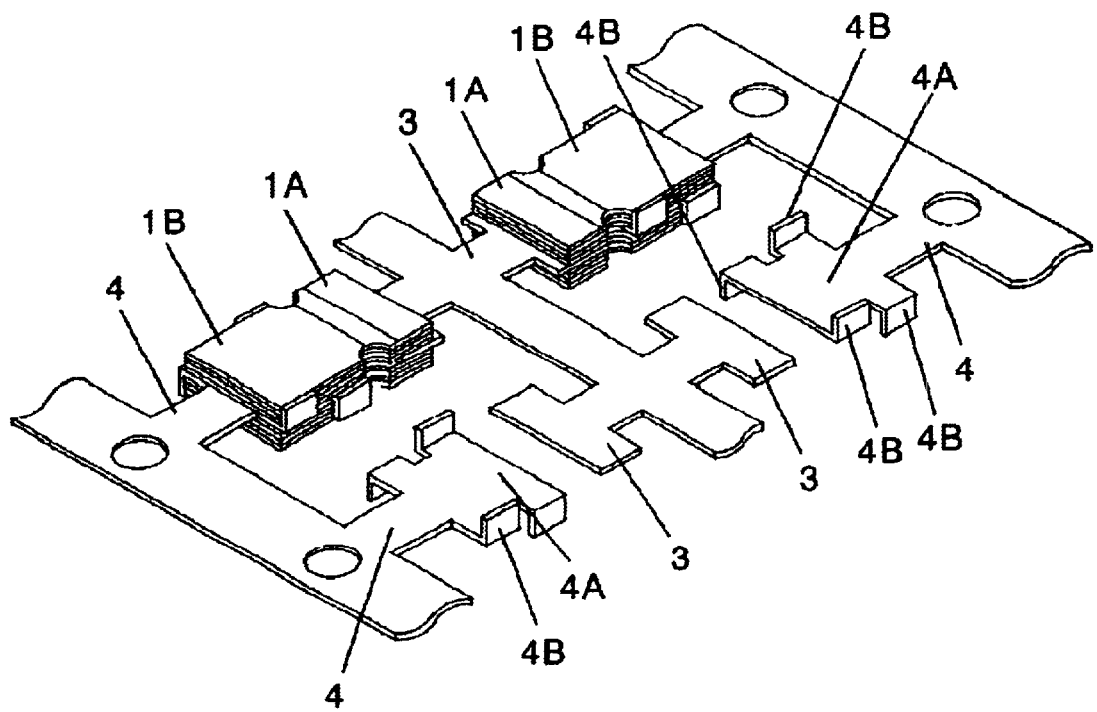
FIG. 2 is a perspective view showing how a plurality of capacitor elements are disposed on an anode lead frame and cathode lead frame in exemplary embodiment 1 of the present invention.

A description is made on exemplary embodiment 1 with reference to FIG. 1 and FIG. 2 mainly.

Capacitor element (referred to as "element" on occasions, hereafter) 1 is an anode body composed of foil of aluminum, which is a valve action metal, and divided into anode member 1A and cathode member 1B. On the surface of cathode member 1B are formed by stacking in succession a dielectric oxide film layer, solid electrolyte layer and cathode layer (none of these are shown in the drawings).

Capacitor element stack body 2 (referred to general as "stack body", hereafter) is formed by stacking a plurality of elements 1 on top of each other in layers and anode lead frame 3 and cathode lead frame 4 are connected thereto. A detailed description is given to the foregoing structure as follows:

A plurality of anode members 1A of element 1 are stacked on top of each other in layers and then disposed on both upper and bottom surfaces of anode lead frame 3, respectively. Similarly, a plurality of cathode members 1B of element 1 are stacked on top of each other in layers and then disposed on both upper and bottom surfaces of cathode lead frame 4, respectively. Then, respective anode members 1A are joined integrally to anode lead frame 3 by laser welding. On the other hand, respective cathode members 1B are connected integrally with connecting member 4B via a conducting silver paste (not shown in the drawings). Connecting member 4B is prepared by bending into a right angle in advance part of each respective end of flat member 4A along the side surface extending in the thickness direction of capacitor element 1.

Stack body 2 thus structured is encapsulated with insulating packaging resin 5 in such a way as part of respective anode lead frame 3 and cathode lead frame 4 of stack body 2 is exposed to the outer surface of encapsulated stack body 2, thereby allowing a solid electrolytic capacitor (referred to generally as "SEC", hereafter) in exemplary embodiment 1 of the present invention to be realized.

The SEC in exemplary embodiment 1 of the present invention is actually produced as follows:

A hoop, on which anode lead frames 3 and cathode lead frames 4 are formed continuously at predetermined intervals as FIG. 2 shows, is used and anode member 1A of element 1 is disposed on anode lead frame 3. On the other hand, cathode member 1B of element 1 is disposed on cathode lead frame 4 and the side surface of cathode member 1B is joined to connecting member 4B via a conductive silver paste (not shown in the drawings). Similarly, while elements 1 are stacked on top of each other in layers in succession on the upper surface of the hoop at a predetermined position thereof, the side surface of each respective cathode member 1B is joined to connecting member 4B. Then, similar steps are performed by reversing the rotational direction of the hoop, thereby carrying out assembly work of stack body 2 that has a plurality of elements 1 stacked on top of each other in layers on both surfaces of the hoop, respectively.

The manufacturing method of the SEC in exemplary embodiment 1 of the present invention does not require such complicated steps as first preparing a capacitor element stack unit by stacking a plurality of capacitor elements on top of each other in layers and then stacking a plurality of the capacitor element stack units on top of each other in piles, thereby producing an SEC. Accordingly, the workability of assembly work is improved due to a reduction in component count and also in assembly steps, resulting in realization of a low cost product.

Applying a conductive silver paste to the side surface of a plurality of cathode members 1B, each constituting stack body 2 and the side surface extending in the thickness direction of element 1, allows respective cathode members 1B to be electrically connected with one another. One end of connecting member 4B of cathode lead frame 4 connected to the side surface of cathode member 1B serves as a cathode terminal for external connection. According to the structure as described in above, the distance of cathode lead is made the shortest possible and the equivalent series resistance (ESR) characteristics of the SEC thus realized are close to the ones of an ideal capacitor and rated as extremely excellent.

Figure 3:
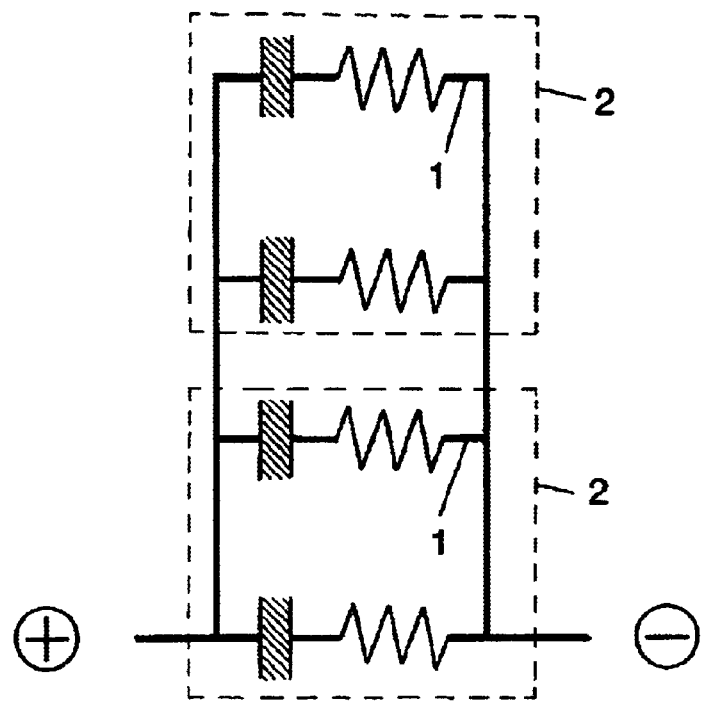
FIG. 3 is a schematic circuit diagram for describing an improvement of ESR characteristics in exemplary embodiment 1 of the present invention.

In this case, the ESR characteristics are improved by the following factors:

As the schematic circuit diagram of FIG. 3 shows, applying a conductive silver paste to the side surface extending in the thickness direction of cathode member 1B of element 1 that constitutes each respective stack body 2 results in connecting integrally and electrically a plurality of elements 1 with one another, thereby allowing no resistance to be produced between stack layers of element 1. Further, a conductive silver paste is applied to the side surface of each respective cathode member 1B of stack body 2 to connect integrally and electrically with one another, thereby achieving connections of a plurality of stack bodies 2 without creating any resistance between stack bodies 2.

An SEC of 6.3 V, 100 μF is prepared in accordance with exemplary embodiment 1 of the present invention and ESR characteristics thereof are measured. Table 1 shows the measurement results in comparison with the data on a prior art capacitor. Also, a prior art solid electrolytic capacitor of 4 V, 56 μF with a conductive silver paste applied to the side surface of the cathode member thereof is prepared and ESR characteristics are measured. Table 2 shows the measurement results in comparison with the data on an ordinary prior art capacitor. The capacitors are prepared in quantities of 30 for each.

TABLE 1

|  | Average Value (mΩ) | Standard Deviation (mΩ) |
| --- | --- | --- |
| Prior Art Capacitor | 10.7 | 2.1 |
| Capacitor of Exemplary Embodiment 1 | 7.4 | 0.8 |

TABLE 2

|  | Average Value (mΩ) | Standard Deviation (mΩ) |
| --- | --- | --- |
| Prior Art Capacitor | 13.4 | 2.6 |
| Capacitor with Silver Paste Applied | 9.1 | 0.6 |

By applying a conductive paste to the side surface of each respective cathode member 1B, electrical connections are improved and farther the electrical connections are made more reliable as a result of mounting on cathode lead frame 4.

The solid electrolytic capacitor of the present invention does not require a conductive silver paste to be applied between capacitor elements 1 although the conductive silver paste was required between capacitor elements in the case of the prior art solid electrolytic capacitor, thereby allowing the dimension of the SEC in the height direction to be reduced with a resulting reduction in thickness of the SEC.

Exemplary Embodiment 2

Figure 4:
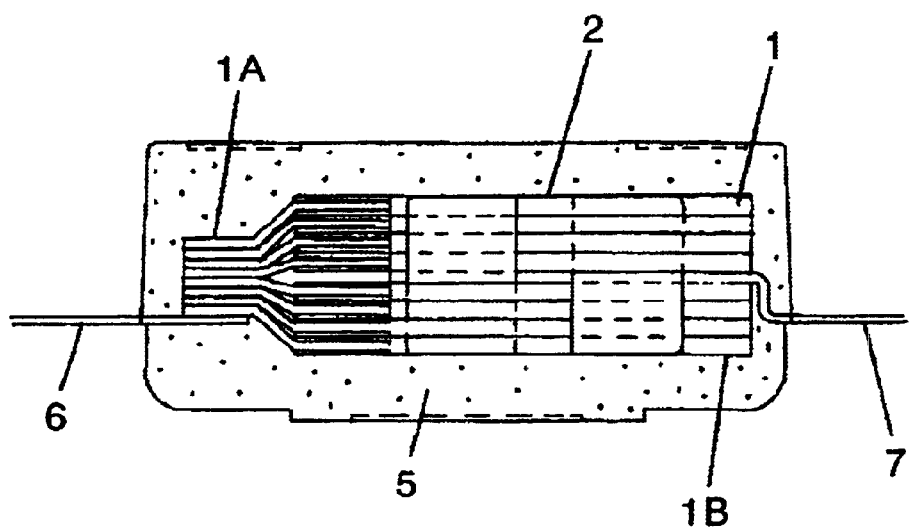
FIG. 4 is a cross-sectional view showing the structure of a solid electrolytic capacitor in exemplary embodiment 2 of the present invention.

An SEC in exemplary embodiment 2 is similar to the SEC in exemplary embodiment 1 except that the configurations of anode and cathode lead frames are made different from the ones of the SEC in exemplary embodiment 1. A description is given to the aforementioned differences only with reference to FIG. 4 and FIG. 5.

A plurality of anode members 1A of respective elements 1 are stacked on top of each other in layers and disposed on one surface of anode lead frame 6. On the other hand, a plurality of cathode members 1B are stacked on top of each other in layers and disposed on the upper and bottom surfaces of cathode lead frame 7, respectively. Each respective anode member 1A is joined integrally to anode lead frame 6 by laser welding. Respective cathode members 1B are connected integrally to connecting member 7B provided on cathode lead frame 7 on the side of cathode members 1B, which extends in the thickness direction of element 1, via a conductive silver paste (not shown in the drawings). Connecting member 7B is prepared by bending in advance part of each respective end of flat member 7A of cathode lead frame 7B into a right angle. Also, a step-like difference in level, which equals to the thickness of element 1 stacked in height, is formed on flat member 7A at the position opposite to anode member 1A.

The SEC thus structured according to exemplary embodiment 2 of the present invention demonstrates the advantages similar to the ones of the SEC in exemplary embodiment 1. Only difference from the SEC in exemplary embodiment 1 is in a change of the positions of anode lead frame 6 and cathode lead frame 7 that also serve as external terminals. This much flexibility of design is well within the effectiveness of the present invention.

Exemplary Embodiment 3

Figure 6:
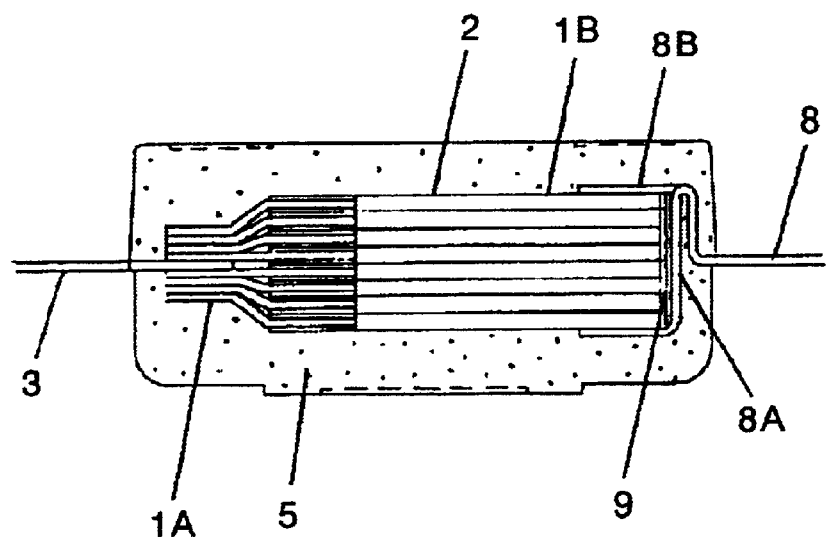
FIG. 6 is a cross-sectional view showing the structure of a solid electrolytic capacitor in exemplary embodiment 3 of the present invention.
Figure 7:
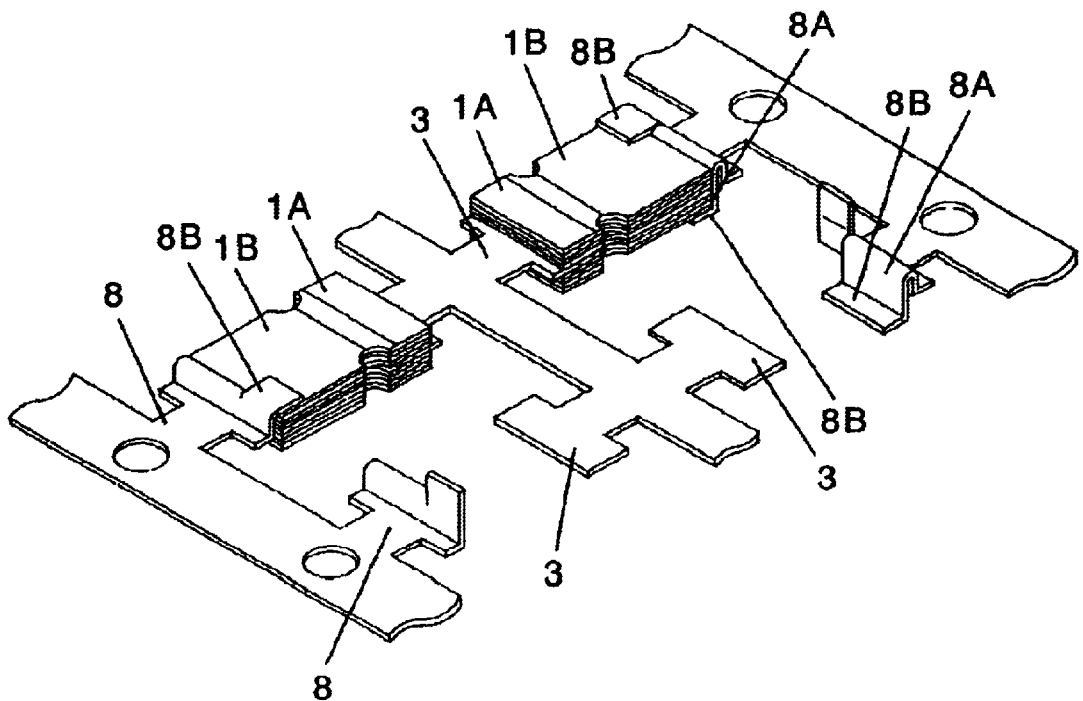
FIG. 7 is a perspective view showing how a plurality of capacitor elements are disposed on an anode lead frame and cathode lead frame in exemplary embodiment 3 of the present invention.

An SEC in exemplary embodiment 3 is similar to the SEC in exemplary embodiment 1 except that the configuration of cathode lead frame is made different from the one of the SEC in exemplar embodiment 1. A description is given to the aforementioned difference only with reference to FIG. 6 and FIG. 7.

Cathode lead frame 8 has connecting member 8A and holding member 8B that are formed by bending part of cathode lead frame 8, respectively.

Connecting member 8A is located on stack body 2 at the side opposite to anode member 1A. Each respective cathode member 1B of element 1 is connected integrally to connecting member 8A on the side surface extending in the thickness direction of element 1 via conductive silver paste 9. Holding member 8B holds stack body 2 on the upper and bottom surfaces thereof.

The SEC thus structured according to exemplary embodiment 3 of the present invention demonstrates the performance closer to that of an ideal capacitor than the performance of the SEC in exemplary embodiment 1 of the present invention since the distance of cathode lead is made the shortest possible. An SEC of 6.3 V, 100 μF is prepared in quantities of 30 according to exemplary embodiment 3 of the present invention and ESR characteristics thereof are measured. Table 3 shows the measurement results in comparison with the data on a prior art capacitor.

TABLE 3

|  | Average Value (mΩ) | Standard Deviation (mΩ) |
| --- | --- | --- |
| Prior Art Capacitor | 10.7 | 2.1 |
| Capacitor of Exemplary Embodiment 3 | 6.9 | 0.4 |

Exemplary Embodiment 4

Figure 8:
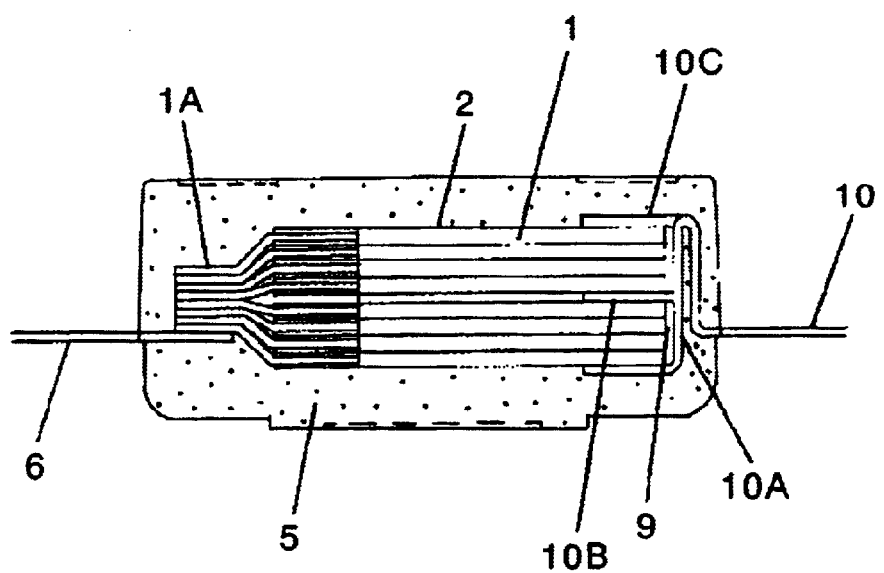
FIG. 8 is a cross-sectional view showing the structure of a solid electrolytic capacitor in exemplary embodiment 4 of the present invention.
Figure 9:
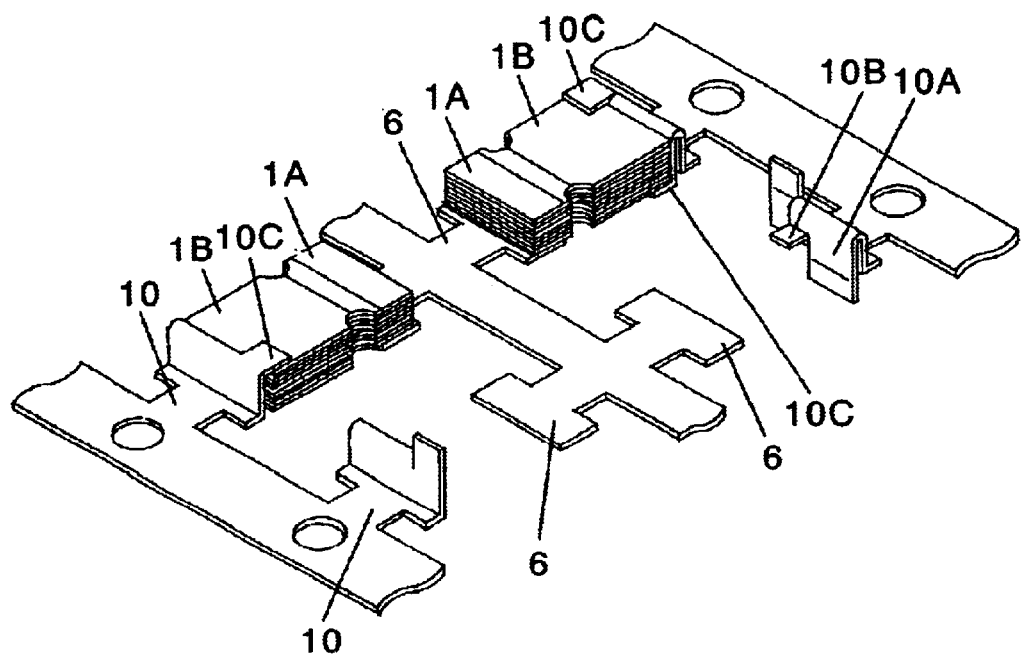
FIG. 9 is a perspective view showing how a plurality of capacitor elements are disposed on an anode lead frame and cathode lead frame in exemplary embodiment 4 of the present invention.

An SEC in exemplary embodiment 4 is similar to the SEC in exemplary embodiment 2 except that the configuration of cathode lead frame is made different from the one of the SEC in exemplary embodiment 2. A description is given to the aforementioned difference only with reference to FIG. 8 and FIG. 9.

Cathode lead frame 10 has connecting members 10A and 10B and holding member 10C that are formed by bending part of cathode lead frame 10, respectively.

Connecting member 10A is located on stack body 2 at the side opposite to anode member 1A. Each respective cathode member 1B of element 1 is connected integrally to connecting member 10A on the side surface extending in the thickness direction of element 1 via conductive silver paste 9. Connecting member 10B is placed between stack layers of stack body 2 for connection. Holding member 10C holds stack body 2 on the upper and bottom surfaces thereof.

The SEC thus structured according to exemplary embodiment 4 of the present invention demonstrates enhanced reliability in connection because connecting member 10B is placed between stack layers of stack body 2 for connection in addition to demonstrating the advantages realized in exemplary embodiment 3 of the present invention.

Exemplary Embodiment 5

Figure 10:
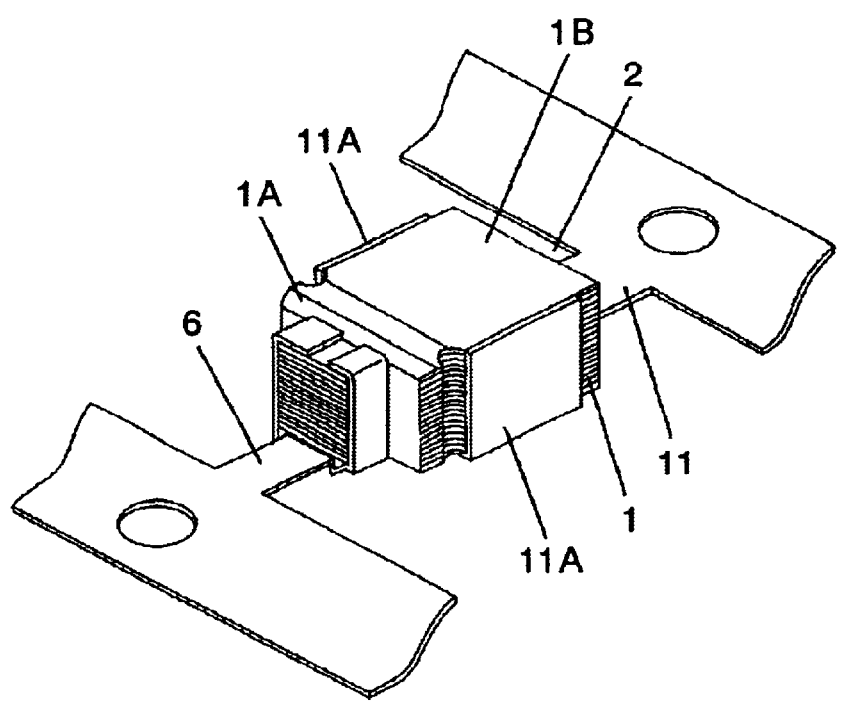
FIG. 10 is a perspective view showing the structure of a solid electrolytic capacitor in exemplary embodiment 5 of the present invention.
Figure 31:
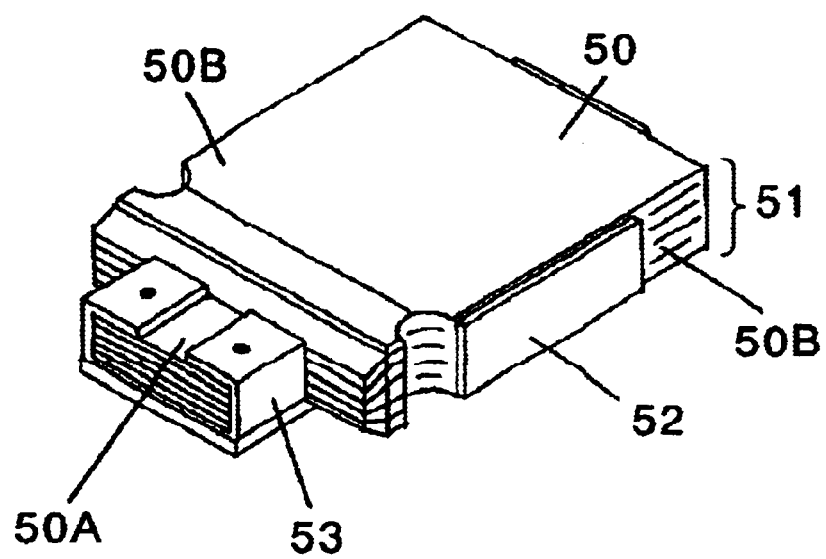
FIG. 31 is a perspective view showing the structure of a prior art capacitor element stack unit.
Figure 32:
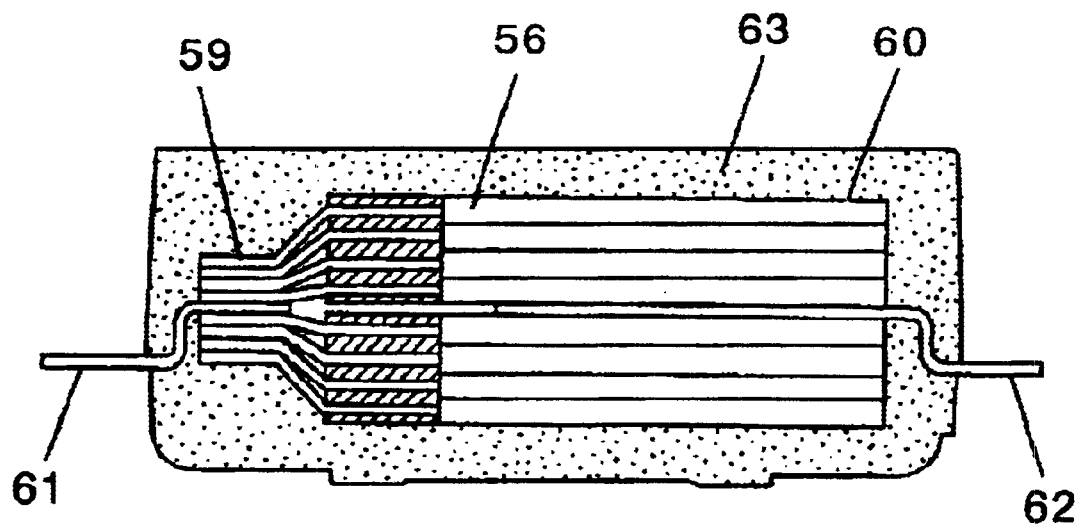
FIG. 32 is a cross-sectional view showing the structure of another prior art solid electrolytic capacitor.
Figure 33:
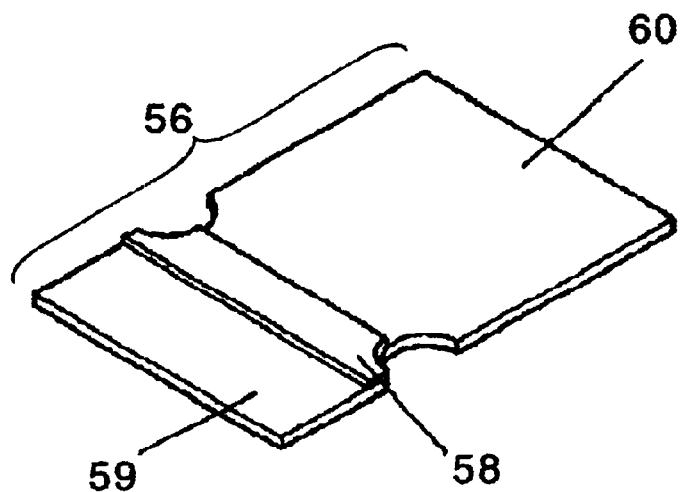
FIG. 33 is a perspective view of a capacitor element used in another prior art solid electrolytic capacitor.
Figure 34:
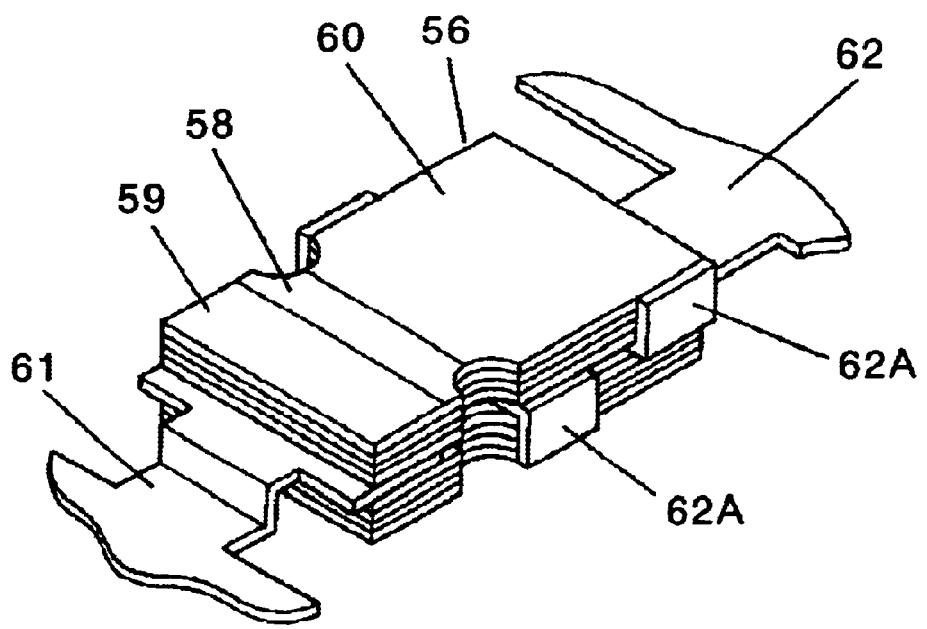
FIG. 34 is a perspective view showing how a plurality of capacitor elements are stacked on top of each other in layers and mounted on an anode lead frame and a cathode lead frame in another prior art solid electrolytic capacitor.
Figure 35:
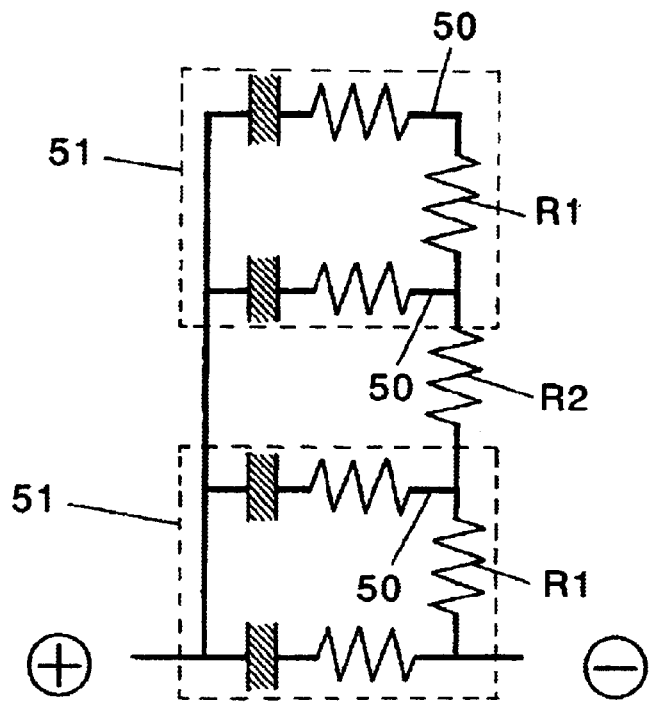
FIG. 35 is a schematic illustration for describing ESR characteristics of another prior art solid electrolytic capacitor.
Figure 36:
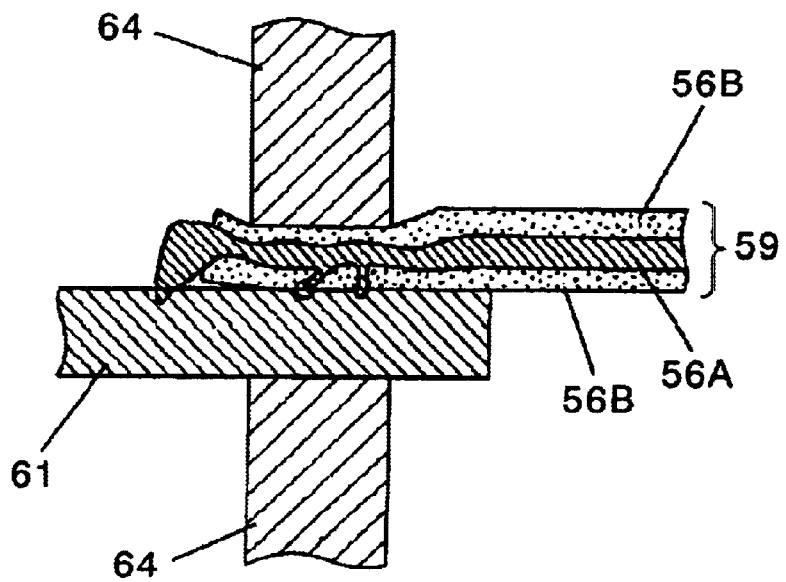
FIG. 36 is a cross-sectional view showing how an anode member is joined to an anode lead frame in another prior art solid electrolytic capacitor.

An SEC in exemplary embodiment 5 is similar to the SEC in exemplary embodiment 2 except that the configuration of cathode lead frame is made different from the one of the SEC in exemplary embodiment 2. However, the connections at the anode side are actually performed according to a method similar to the method employed in preparing the prior art capacitor element stack unit as FIG. 31 shows. Since the important point made here by the present invention is in the configuration of cathode lead frame, a description is given to the aforementioned difference in the configuration of cathode lead frame only with reference to FIG. 10. A detailed description of the connections at the anode side is omitted.

Cathode lead frame 11 has two kinds of structural member as follows:

5-1. A flat member (not shown in the drawing), on which cathode member 1B of stack body 2 is disposed.

5-2. A pair of connecting members 11A formed by bending both ends of the aforementioned flat member upward to connect integrally with cathode member 1B of stack body 2 on the side surface extending in the thickness direction of element 1.

Figure 5:
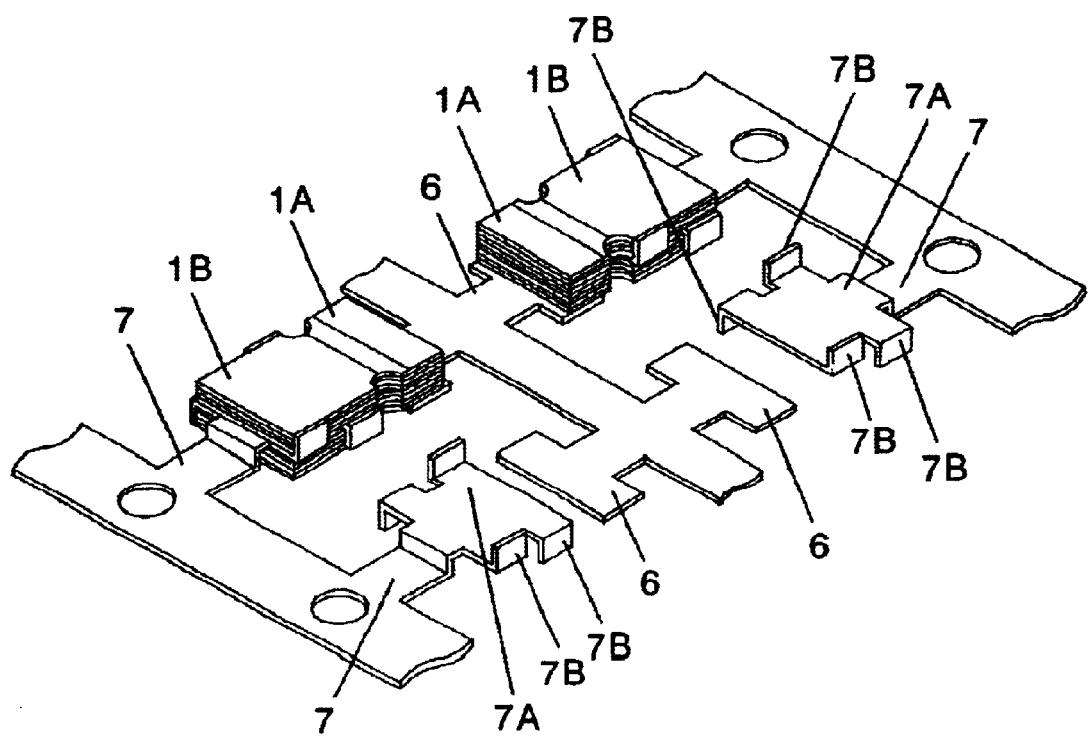
FIG. 5 is a perspective view showing how a plurality of capacitor elements are disposed on an anode lead frame and cathode lead frame in exemplary embodiment 2 of the present invention.

In other words, in FIG. 5 as used in describing the SEC in exemplary embodiment 2 of the present invention, there is provided step-like difference in level, which equals to the thickness of element 1 stacked in height, on flat member 7A at the place where connecting member 7B is not located. But there is provided no step-like difference in level in exemplary embodiment 5 of the present invention. Connecting member 11A is provided only on one side of the flat member unlike connecting member 4B, which is formed by bending both upward and downward.

The SEC thus structured according to exemplary embodiment 5 of the present invention demonstrates improved workability because elements 1 are stacked on one side of the flat member in addition to the advantages demonstrated in exemplary embodiment 2 of the present invention.

Exemplary Embodiment 6

Figure 11:
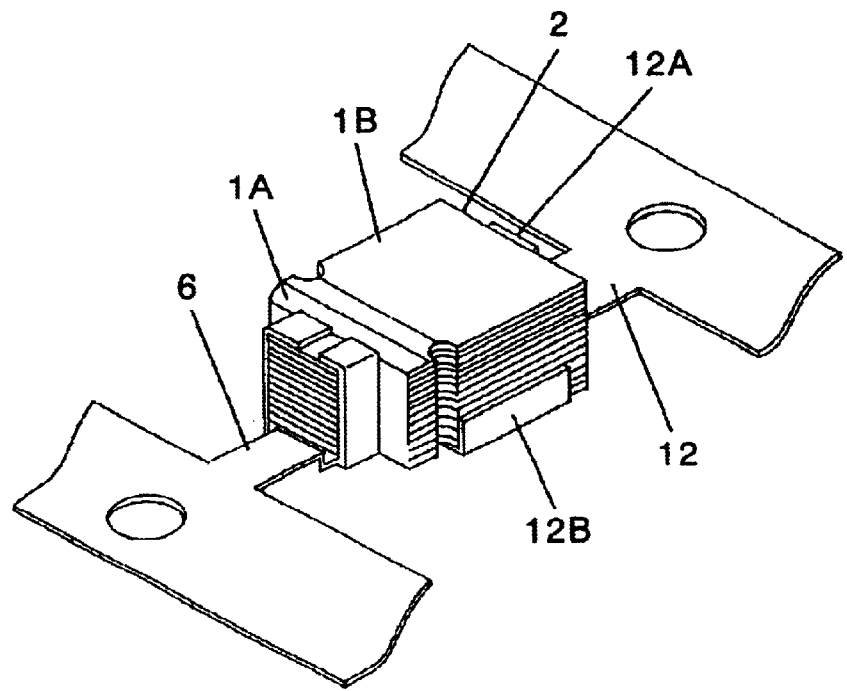
FIG. 11 is a perspective view showing the structure of a solid electrolytic capacitor in exemplary embodiment 6 of the present invention.

An SEC in exemplary embodiment 6 is similar to the SEC in exemplary embodiment 5 except that the configuration of cathode lead frame is made different from the one of the SEC in exemplary embodiment 5. A description is given to the aforementioned difference only with reference to FIG. 11.

Cathode lead frame 12 has three kinds of structural member as follows:

6-1. A flat member (not shown in the drawing), on which cathode member 1B of stack body 2 is disposed.

6-2. Connecting member 12A formed by bending part of the aforementioned flat member upward, the part being located at the side opposite to anode member 1A of stack body 2, to connect integrally with cathode member 1B of stack body 2 on the side surface extending in the thickness direction of element 1.

6-3. A pair of guiding members 12B formed by bending both ends of the flat member upward so as to make respective guiding members 12B face opposite to each other. Guiding member 12B acts as means for determining the position of stack body 2.

The SEC thus structured according to exemplary embodiment 6 of the present invention demonstrates improved ESR characteristics because connecting-points of cathode member 1B are increased in number in comparison with the SEC in exemplary embodiment 2 of the present invention and the resistance involved with cathode member 1B declines.

Exemplary Embodiment 7

Figure 12:
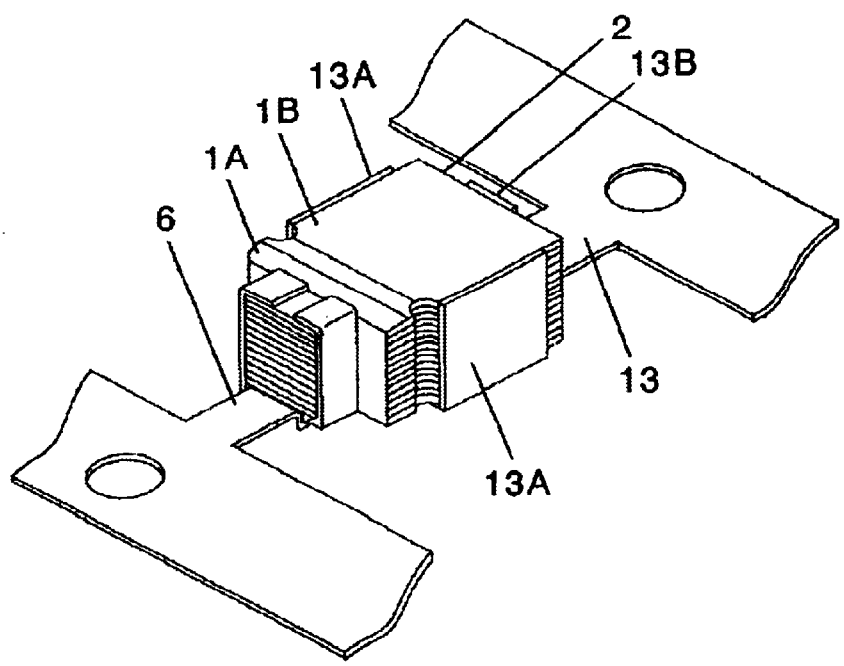
FIG. 12 is a perspective view showing the structure of a solid electrolytic capacitor in exemplary embodiment 7 of the present invention.

An SEC in exemplary embodiment 7 is similar to the SEC in exemplary embodiment 5 except that the configuration of anode lead frame is made different from the one of the SEC in exemplary embodiment 5. A description is given to the aforementioned difference only with reference to FIG. 12.

Connecting member 13A provided on cathode lead frame 13 is made long enough to cover the entire side surface of cathode member 1B of stack body 2 for connection.

The SEC thus structured according to exemplary embodiment 7 of the present invention demonstrates improved ESR characteristics because connecting points of cathode member 1B are further increased in number in comparison with the SEC in exemplary embodiment 6 of the present invention and the resistance involved with cathode member 1B declines further.

Exemplary Embodiment 8

Figure 13:
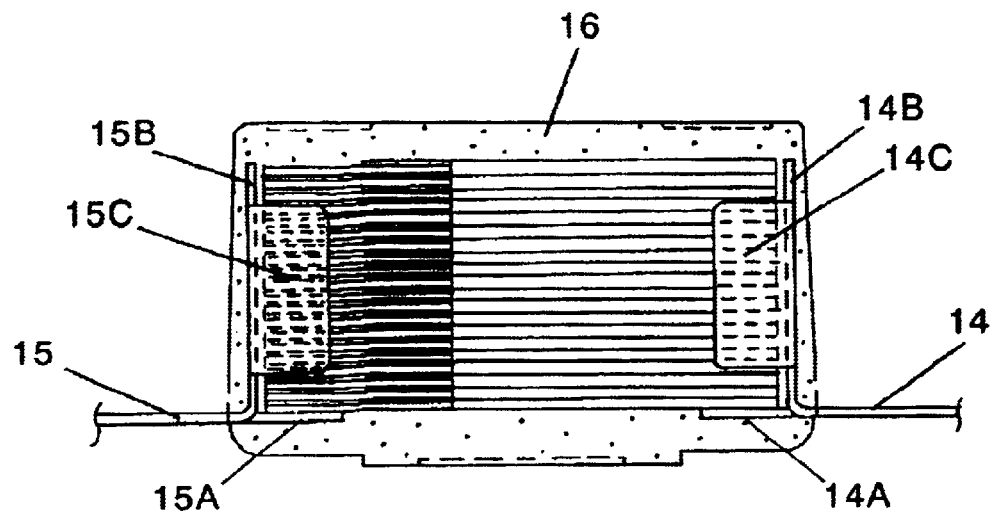
FIG. 13 is a cross-sectional view showing the structure of a solid electrolytic capacitor in exemplary embodiment 8 of the present invention.
Figure 14:
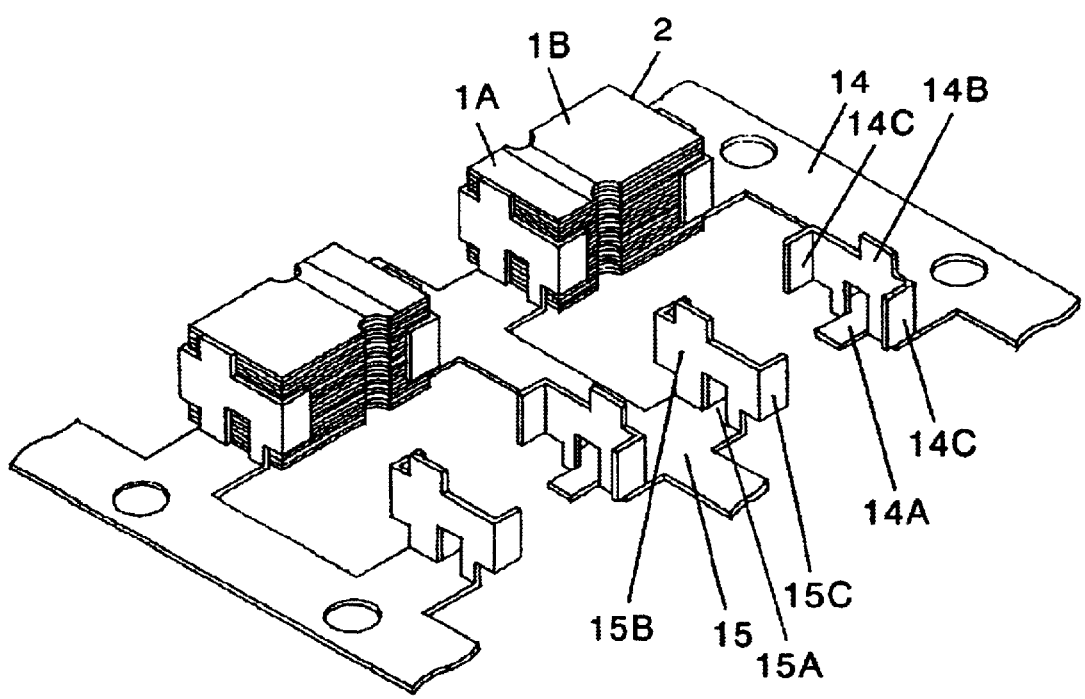
FIG. 14 is a perspective view showing how a plurality of capacitor elements are disposed on an anode lead frame and cathode lead frame in exemplary embodiment 8 of the present invention.
Figure 15:
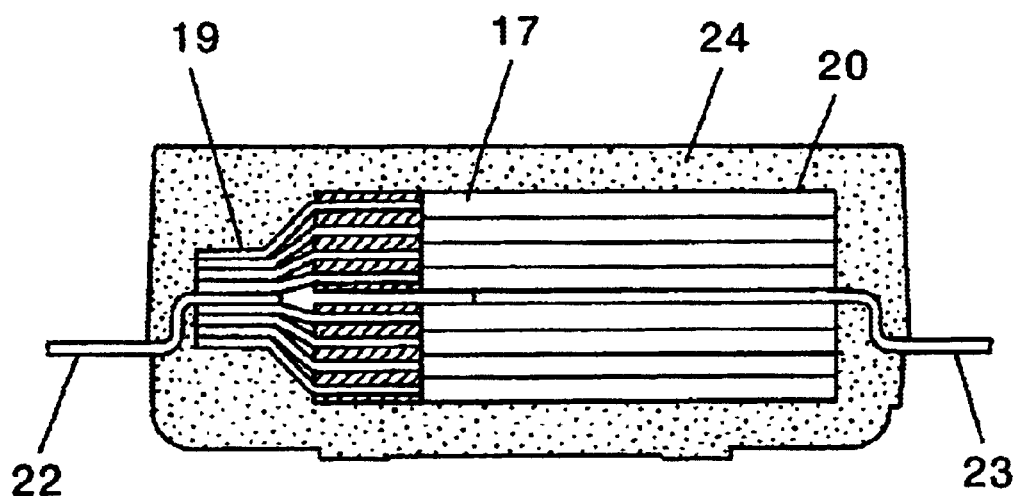
FIG. 15 is a cross-sectional view showing the structure of a solid electrolytic capacitor in exemplary embodiment 9 of the present invention.
Figure 16:
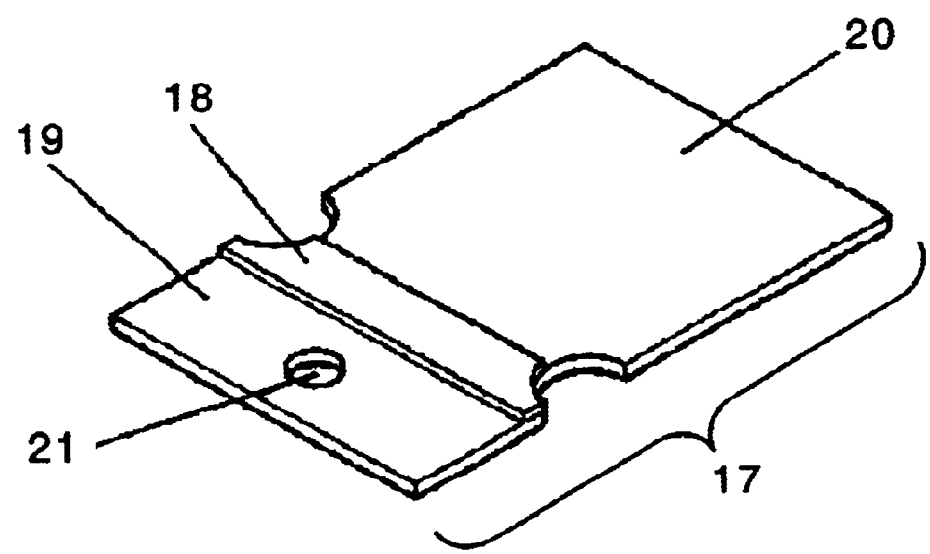
FIG. 16 is a perspective view of a capacitor element used in the solid electrolytic capacitor in exemplary embodiment 9 of the present invention.
Figure 17:
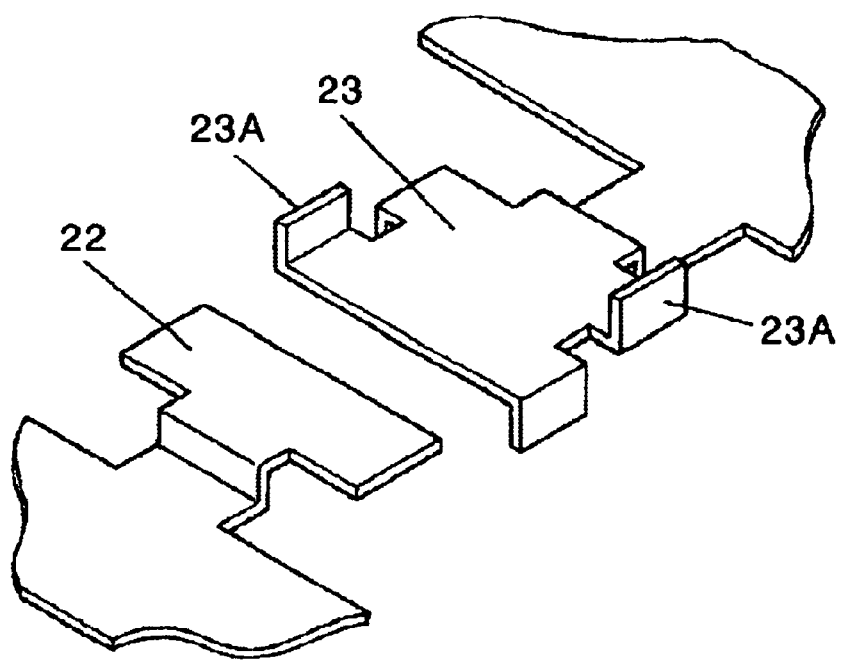
FIG. 17 is a perspective view of an anode lead frame and a cathode lead frame used in the solid electrolytic capacitor in exemplary embodiment 9 of the present invention.
Figure 18:
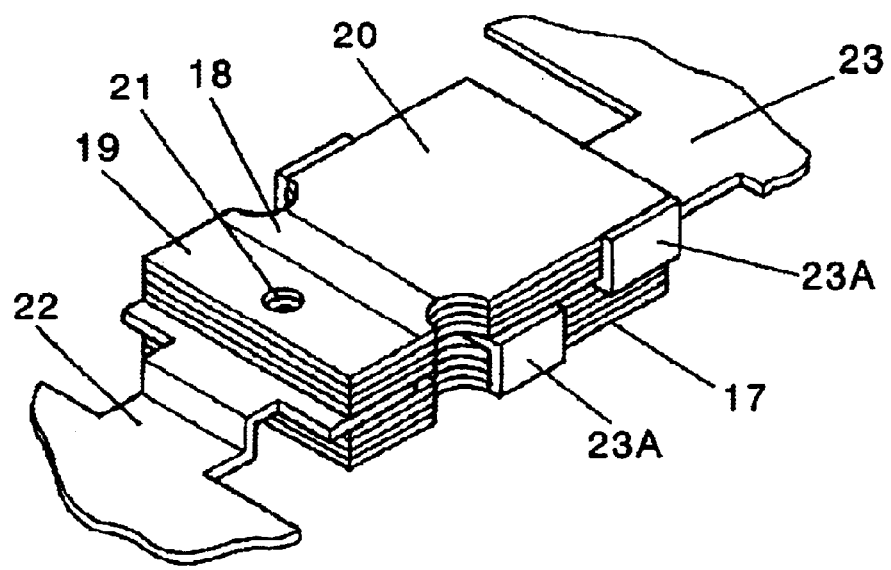
FIG. 18 is a perspective view showing how a plurality of capacitor elements are stacked on top of each other in layers and mounted on an anode lead frame and a cathode lead frame in exemplary embodiment 9 of the present invention.

An SEC in exemplary embodiment 8 is similar to the SEC in exemplary embodiment 2 except that the configurations of anode and cathode lead frames are made different from the ones of the SEC in exemplary embodiment 2. A description is given to the aforementioned differences only with reference to FIG. 13 and FIG. 14.

Cathode lead frame 14 has three kinds of structural member as follows:

8-1. Flat member 14A, on which cathode member 1B of stack body 2 is disposed.

8-2. Connecting member 14B formed by bending part of flat member 14A upward, the part being located at the side opposite to anode member 1A of stack body 2, to connect integrally with cathode member 1B of stack body 2 on the side surface extending in the thickness direction of element 1.

8-3. A pair of guiding members 14C armed by bending both ends of connecting member 14B upward to guide cathode member 1B of stack body 2.

On the other hand, on anode lead frame 15 are similarly provided flat member 15A, connecting member 15B to connect anode member 1A of stack body 2 and guiding member 15C to guide anode member 1A of stack body 2.

The SEC thus structured according to exemplary embodiment 8 of the present invention demonstrates enhanced stack accuracy because of the use of guiding members 14C and 15C in addition to the similar advantages demonstrated in exemplary embodiment 2 of the present invention.

Although the advantages described in above are demonstrated just by having any one of cathode lead frame 14 and anode lead frame 15 provided with the guiding member, it is preferred to have both the cathode and anode lead frames provided with the guiding member.

Exemplary Embodiment 9

In FIG. 15 to FIG. 19, element 17 has the surface of an anode body made of aluminum foil 17A, in which aluminum is a valve action metal, deposited with dielectric oxide film layer 17B and then divided into anode member 19 and cathode member 20 by providing resist 18 in place. On the surface of cathode member 20 are formed by stacking a solid electrolyte layer and cathode layer (both not shown in the drawings) in succession. Further, through hole 21 is formed in anode member 19.

An SEC in exemplary embodiment 9 of the present invention is structured as follows:

9-1. A plurality of anode members 19 of element 17 are stacked on top of each other in layers on both upper and bottom surfaces of anode lead frame 22 and a plurality of cathode members 20 of element 17 are stacked similarly on both upper and bottom surfaces of cathode lead frame 23, respectively.

9-2. Respective anode members 19 are joined integrally to anode lead frame 22 via through hole 21 provided on anode member 19 by resistance welding.

9-3. Respective cathode members 20 are connected integrally to connecting member 23A provided on cathode lead frame 23 on the side surface extending in the thickness direction of element 17 via a conductive silver paste (not shown in the drawings).

Connecting member 23A is formed by bending part of a flat member of cathode lead frame 23 upward.

A stack body thus structured is encapsulated by insulating packaging resin 24 so as to have part of each respective anode lead frame 22 and cathode lead frame 23 exposed to the outer surface of packaging resin 24. Anode lead frame 22 and cathode lead frame 23 exposed from packaging resin 24 are bent along the surface (not shown in the drawings) of packaging resin 24, thereby realizing a surface mount type solid electrolytic capacitor.

Figure 19:
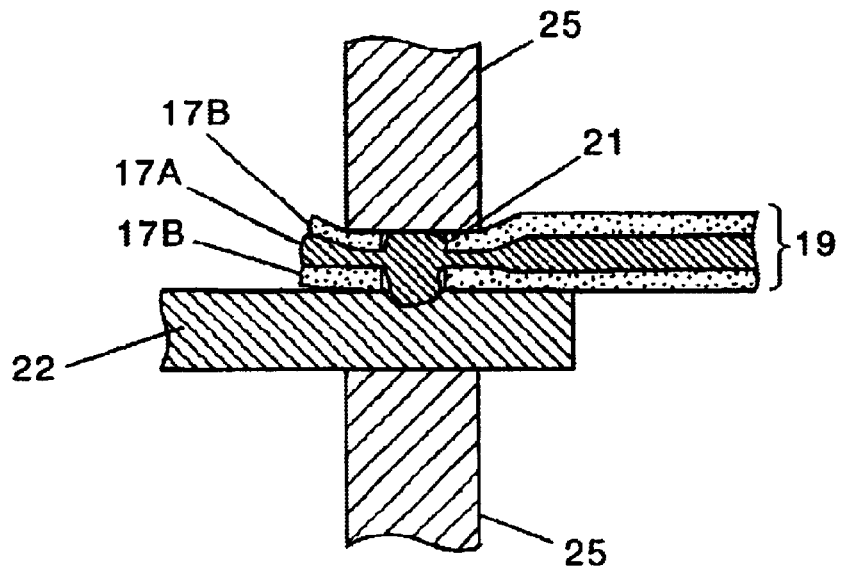
FIG. 19 is a cross-sectional view showing how an anode member is joined to the anode lead frame in exemplary embodiment 9 of the present invention.

As FIG. 19 shows in detail, the SEC in exemplary embodiment 9 has anode member 19 joined to anode lead frame 22 by resistance welding via through hole 21 provided on anode member 19 by means of resistance welding electrode 25. At this time, molten aluminum foil 17A is concentrated inside through hole 21 since aluminum foil 17A is exposed directly on the inner walls of through hole 21 without dielectric oxide film layer 17B covering the surfaces thereof. Therefore, the resistance welding is allowed to be performed with exceptional ease and reliability.

As a result, not only the workability and reliability of welding are stabilized but also no occurrences at all of deteriorated hermeticity, short-circuiting and the like are observed since molten aluminum foil 17A is prevented completely from being released outside.

The SEC in exemplary embodiment 9 is prepared by stacking four of element 17 on top of each other in layers and ESR characteristics are measured. Table 4 shows the measurement results in comparison with a prior art SEC. The SEC is prepared with the ratings of 6.3 V in withstand voltage and 47 μF in capacitance and in quantities of 30 each. The measurement is conducted under the conditions of 100 kHz and 20° C.

TABLE 4

|  | Average Value (mΩ) | Minimum Value (mΩ) | Maximum Value (mΩ) | Standard Deviation (mΩ) |
| --- | --- | --- | --- | --- |
| Prior Art | 18.6 | 9.8 | 35.7 | 4.17 |
| SEC in Exemplary Embodiment 9 | 11.5 | 9.3 | 13.2 | 0.78 |

As Table 4 clearly shows, the SEC in exemplary embodiment 9 has a small variation and a low average value in ESR characteristics. This fact indicates that the welding between anode member 19 and anode lead frame 22 is performed in an extremely excellent manner and also with stability.

Figure 20A:
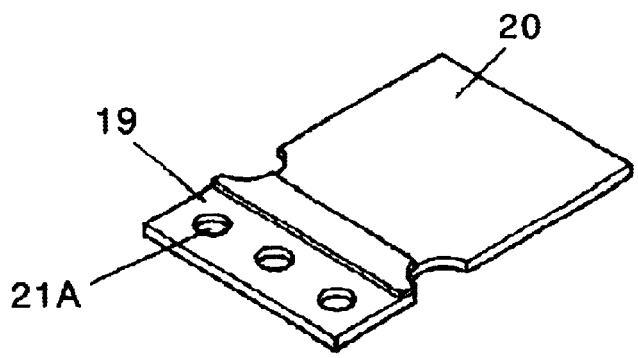
FIG. 20A is a perspective view of another example of through hole provided on an anode member in exemplary embodiment 9 of the present invention.
Figure 20B:
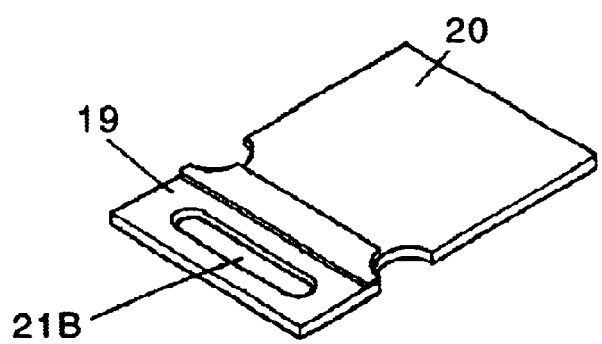
FIG. 20B is a perspective view of still another example of through hole provided on the anode member in exemplary embodiment 9 of the present invention.

FIG. 20A and FIG. 20B show different examples of through hole 21 provided on anode member 19. In these examples, a plurality of circular through holes 21A are provided on anode member 19 and elongated circular through hole 21B is provided on anode member 19, thereby expanding the area of welding. Configurations of these through holes are to be determined appropriately in accordance with the shape, dimensions and the like of anode member 19.

Exemplary Embodiment 10

Figure 21:
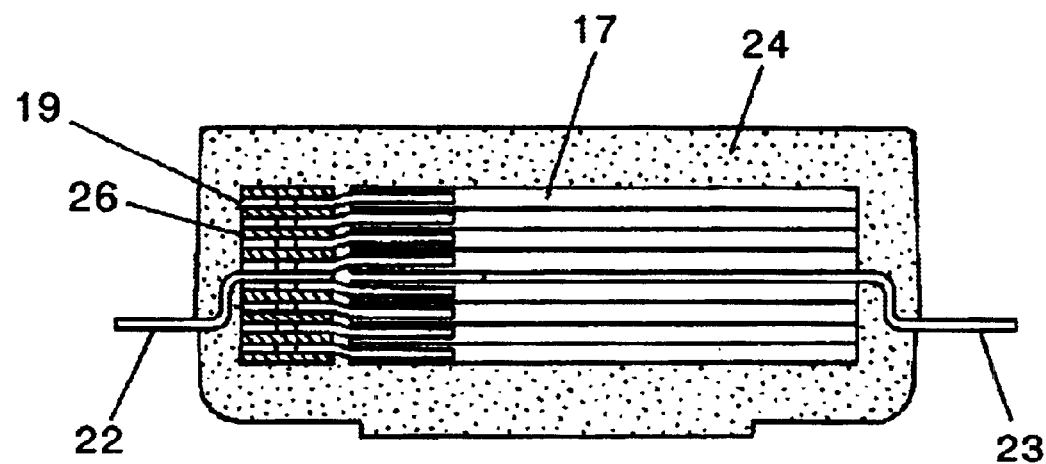
FIG. 21 is a cross-sectional view showing the structure of a solid electrolytic capacitor in exemplary embodiment 10 of the present invention.
Figure 22:
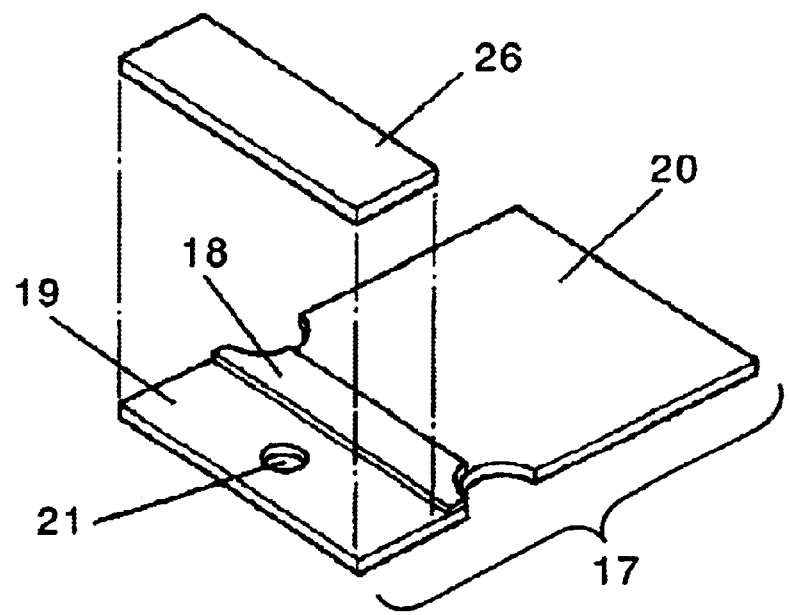
FIG. 22 is a perspective view of a spacer joined to a capacitor element in exemplary embodiment 10 of the present invention.

An SEC in exemplary embodiment 10 is similar to the SEC exemplary embodiment 9 except that a spacer is disposed between respective anode members. A description is given to the aforementioned difference only with reference to FIG. 21 and FIG. 22.

Spacer 26 is formed to have almost the same size as anode member 19 of element 17 and joined to anode member 19 by resistance welding via through hole 21 provided on anode member 19. An arrangement in structure is made so that a combined thickness of spacer 26 and anode member 19 after welding almost equals to the thickness of cathode member 20 of element 17. A plurality of elements 17, each formed by joining spacer 26 to anode member 19, are stacked on top of each other in layers on both surfaces of respective anode lead frame 22 and cathode lead frame 23. The side of cathode member 20 is joined by a conductive adhesive (not shown in the drawings) and the side of anode member 19 is joined by resistance welding.

The SEC structured as in exemplary embodiment 10 has anode lead frame 22 and anode member 19 joined together via spacer 26 made of a metal with no coating film applied to the surface thereof when anode member 19 stacked with a plurality of elements 17 on top of each other in layers is joined to anode lead frame 22 by resistance welding, thereby facilitating the welding process. Further, the surface of welding electrode of resistance welding is contaminated when anode member 19 is welded directly and especially when this welding process is repeated. The adoption of spacer 26, however, prevents the contamination from occurring, thereby allowing the productivity of welding work to be improved.

Spacer 26 also acts as a height adjusting means for anode member 19 and, when spacer 26 is disposed on anode member 19 of element 17, the thickness at the side of anode member 19 becomes almost equal to the thickness of cathode member 20. As a result, anode member 19 is prevented from getting bent and depressed for breakage. Therefore, no cracks or disruptions are caused on the dielectric oxide film layer formed on the surface of anode member 19, thereby allowing an SEC with a low leakage current to be produced with stability.

Leakage currents of the SEC thus structured in exemplary embodiment 10 of the present invention are measured and Table 5 shows the measurement results in comparison with a prior art SEC. The withstand voltage of the measured SEC's is 6.3 V and the quantities of the SEC's prepared for the measurement are 30 for each.

TABLE 5

| | 3 Stack Layers (nA/2 min) | 4 Stack Layers (nA/2 min) | 5 Stack Layers (nA/2 min) | 6 Stack Layers (nA/2 min) |
|---|---|---|---|---|
| Prior Art | 128 | 329 | 901 | 1210 |
| SEC in Exemplary Embodiment 10 | 95 | 113 | 142 | 195 |

As Table 5 clearly shows, the SEC in exemplary embodiment 10 of the present invention allows not only anode lead frame 22 and anode member 19 to join to each other strongly but also allows a structure for minimizing the stress imposed on anode member 19 to be realized, thereby achieving a great reduction in leakage currents. Particularly, when the number of stack layers of element 17 is increased, the aforementioned advantage is more prominent with resulting suppression of leakage currents or the SEC. This advantage is valuable for an SEC, in which capacitance is increased by increasing the number of capacitor element layers to be stacked.

Exemplary Embodiment 11

Figure 23:
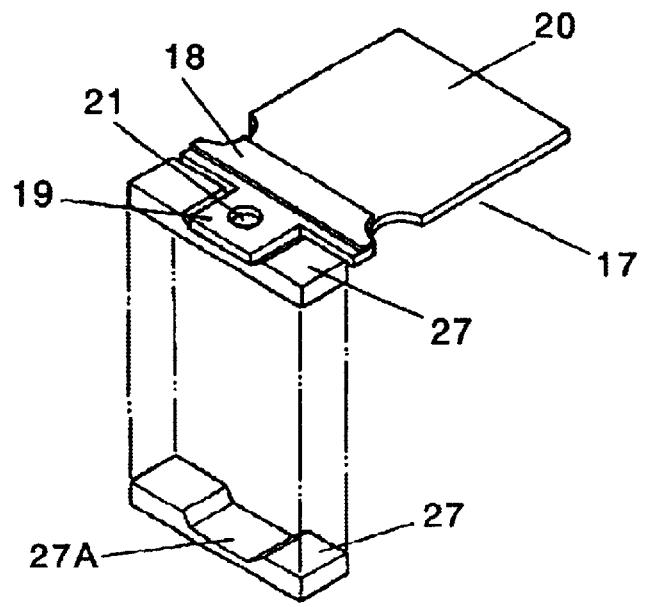
FIG. 23 is a perspective view showing the structure of a solid electrolytic capacitor in exemplary embodiment 11 of the present invention.

An SEC in exemplary embodiment 11 is similar to the SEC in exemplary embodiment 10 except that the configuration of the spacer disposed between respective anode members for a height adjustment is changed. A description is given to the aforementioned difference only with reference to FIG. 23.

Depression 27A provided on spacer 27 is structured so as to be meshed with the end part of anode member 19 of element 17, the end part being formed like a projection. With the SEC in exemplary embodiment 11 of the present invention, anode member 19 of element 17 is fit in depression 27A and spacer 27 is joined to anode member 19 by resistance welding via through hole 21 provided on anode member 19.

The SEC thus structured in exemplary embodiment 11 allows the positioning of element 17 against spacer 27 to be performed precisely, thereby producing an SEC of high reliability through the welding work performed with more increased reliability in addition to exploiting the advantages similar to the ones in exemplary embodiment 10.

Exemplary Embodiment 12

Figure 24:
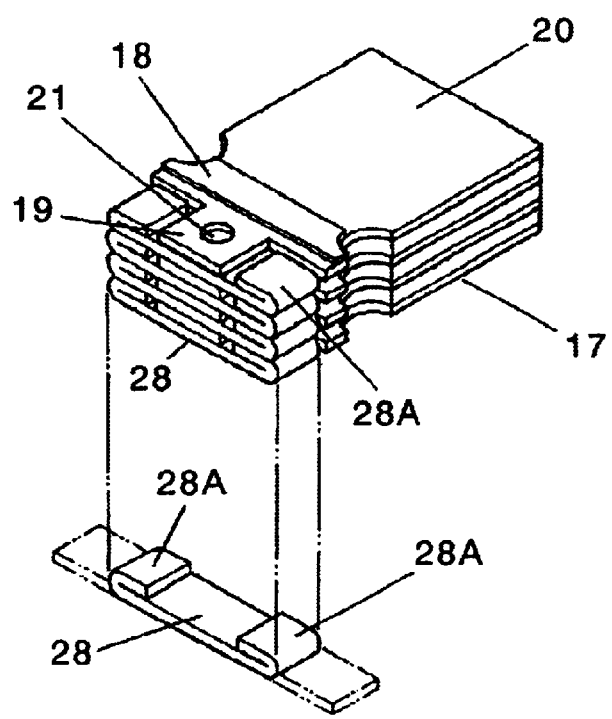
FIG. 24 is a perspective view showing the structure of a solid electrolytic capacitor in exemplary embodiment 12 of the present invention.

An SEC in exemplary embodiment 12 is similar to the SEC in exemplary embodiment 10 except that the configuration of the spacer disposed between respective anode members for a height adjustment is changed. A description is given to the aforementioned difference only with reference to FIG. 24.

Spacer 28 is provided with bent sections 28A formed by folding back each of both end parts of spacer 28 excepting the area where spacer 28 and anode member 19 are brought into contact with each other, thereby formulating a double layered structure of bent section 28A. Between bent sections 28A thus formed at positions opposing to each other is disposed the end part of anode member 19 shaped like a projection. Then, spacer 28 is joined to anode member 19 by resistance welding via through hole 21 provided on anode member 19.

The SEC in exemplary embodiment 12 of the present invention has advantages similar to the ones in exemplary embodiment 11 by realizing a double layered structure of bent sections 28A, which are formed of both end parts of spacer 28 by being folded back, respectively.

Exemplary Embodiment 13

An SEC in exemplary embodiment 13 is similar to the SEC in exemplary embodiment 10 except that the construction of the spacer disposed between respective anode members for a height adjustment and the method of joining between the anode member and the anode lead frame are changed. A description is given to the aforementioned differences only with reference to FIG. 25 and FIG. 26A through FIG. 26C.

Figure 25:
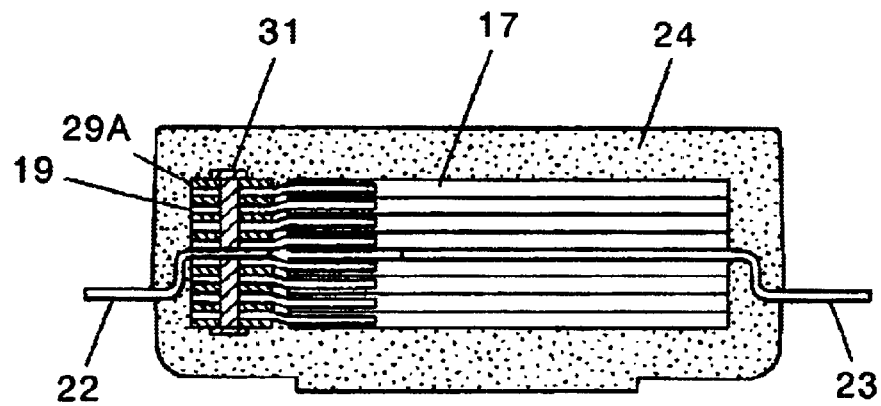
FIG. 25 is a cross-sectional view showing the structure of a solid electrolytic capacitor in exemplary embodiment 13 of the present invention.
Figures 26A, 26B, 26C:
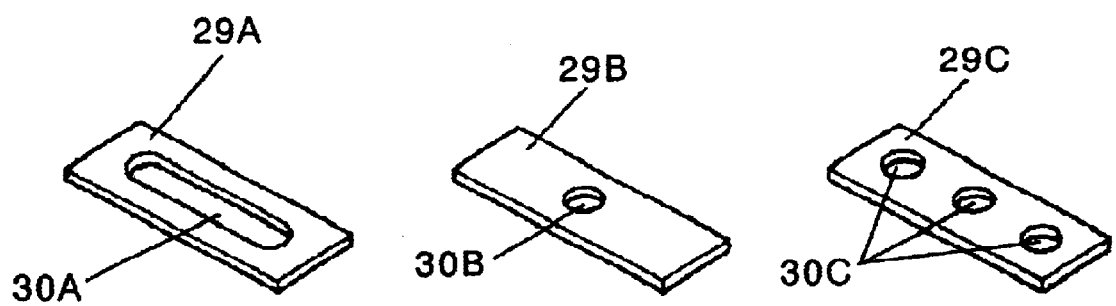
FIG. 26A is a perspective view of a spacer used in the solid electrolytic capacitor in exemplary embodiment 13.
FIG. 26B is a perspective view of another spacer used in the solid electrolytic capacitor in exemplary embodiment 13.
FIG. 26C is a perspective view of still another spacer used in the solid electrolytic capacitor in exemplary embodiment 13.

In FIG. 25 and FIG. 26A, spacer 29A has through hole 30A at the position corresponding to the position of through hole 21 provided on anode member 19 of element 17. Meanwhile, a through hole is provided on anode lead frame 22 at the corresponding position, also. Accordingly, when a plurality of elements 17 are stacked on top of each other in layers on anode lead frame 22, through holes 21 provided on respective anode members 19 and through holes 30A together form a through hole running through all the component parts constituting the stack body. Rivet 31 is inserted in the through hole formed as described in above and anode member 19 and anode lead frame 22 are joined with each other by swaging rivet 31. As other examples of spacer 29A can be considered such spacers as spacers 29B and 29C provided with through holes 30B and 30C, respectively.

According to the structure as described in above, anode lead frame 22 and anode member 19 are not only joined together strongly but also the joining process can be performed without using a welding machine. As a result, a high performance and highly reliable SEC is made available with a simple production setup and production method.

Exemplary Embodiment 14

Figure 27:
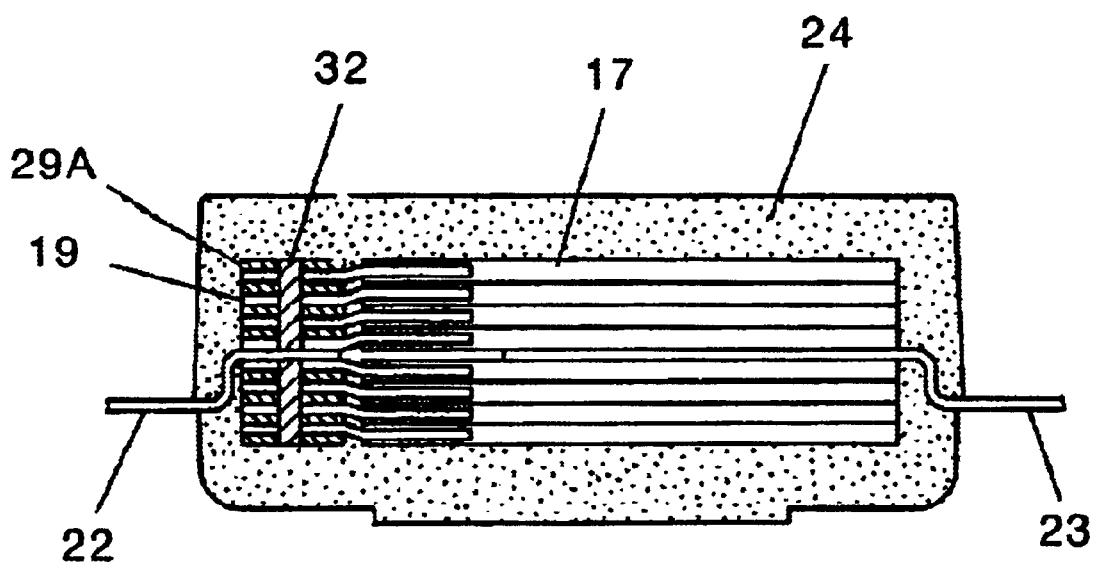
FIG. 27 is a cross-sectional view showing the structure of a solid electrolytic capacitor in exemplary embodiment 14 of the present invention.

An SEC in exemplary embodiment 14 is similar to the SEC in exemplary embodiment 13 except that the method of joining between the anode member and the anode lead frame is changed. A description is given to the aforementioned change only with reference to FIG. 27.

In the similar way as in exemplary embodiment 13, spacer 29A for a height adjustment is provided with a through hole at the position corresponding to through hole 21 provided on anode member 19 of element 17. Also, another through hole is provided on anode lead frame 22 at the position corresponding to through hole 21 provided on anode member 19 of element 17.

In the similar way as in exemplary embodiment 13, when a plurality of elements 17 are stacked on top of each other in layers on anode lead frame 22, a through hole is formed in such a way as running through all through holes 21 provided on respective anode members 19 and through holes provided on respective spacers 29A. Conductive silver paste 32 is filled in the combined single through hole thus formed, thereby allowing anode member 19 and anode lead frame 22 to be joined together.

Accordingly, the advantages similar to the ones realized in exemplary embodiment 13 can be achieved with the SEC in the present exemplary embodiment.

Exemplary Embodiment 15

Figure 28:
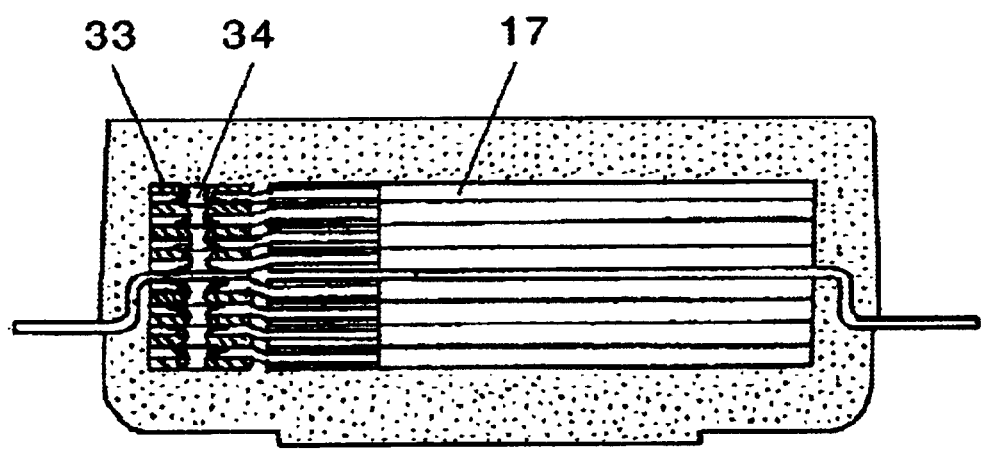
FIG. 28 is a cross-sectional view showing the structure of a solid electrolytic capacitor in exemplary embodiment 15 of the present invention.

An SEC in exemplary embodiment 15 is similar to the SEC in exemplary embodiment 10 except that the method of joining between the anode member and the anode lead frame is changed. A description is given to the aforementioned change only with reference to FIG. 28 and FIG. 29.

Figure 29:
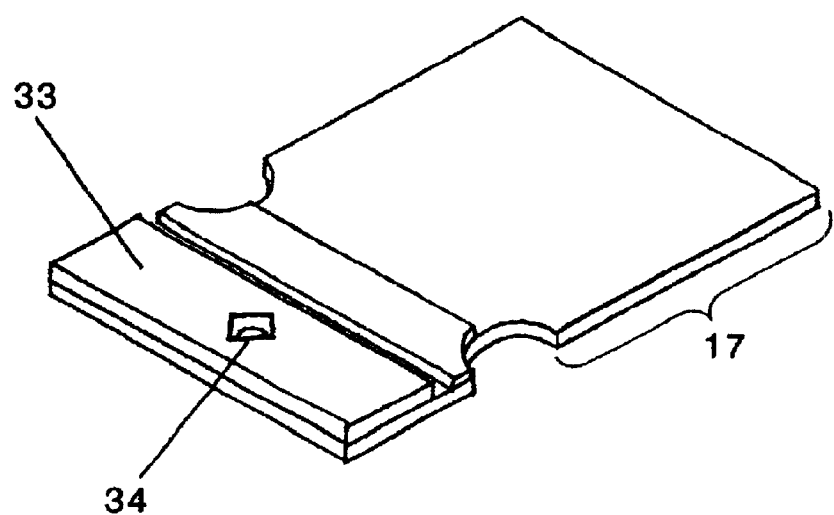
FIG. 29 is a perspective view of a capacitor element used in the solid electrolytic capacitor in exemplary embodiment 15 of the present invention.
Figure 30:
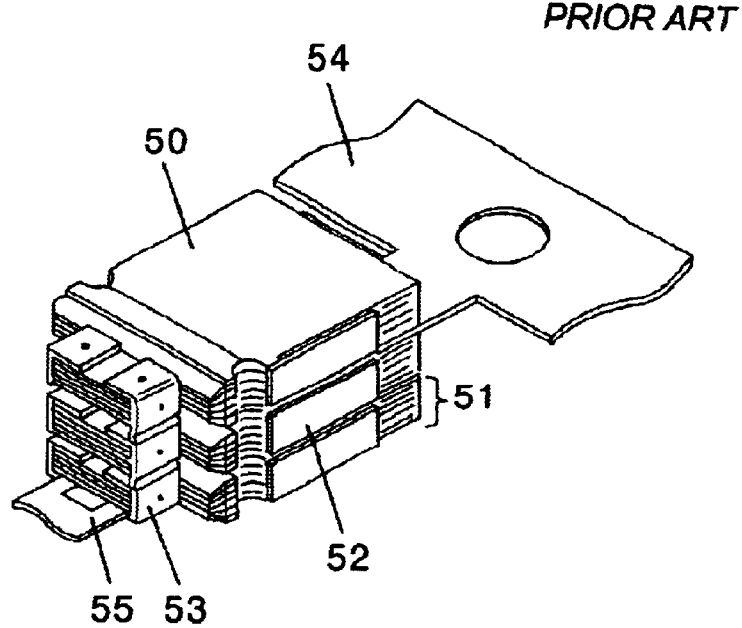
FIG. 30 is a perspective view showing the structure of a prior art solid electrolytic capacitor.

A through hole is provided in advance on spacer 33 and anode member 19, respectively. The positions of respective through holes are aligned with each other and the through holes are swaged together from the side of spacer 33 towards anode member 19 to join both together. FIG. 29 shows the swaged part 34. A plurality of the joined bodies, each formed as described in above, are stacked on top of each other in piles and integrally joined together by laser welding and the like.

Accordingly, the advantages similar to the ones realized in exemplary embodiment 13 can be achieved with the SEC in the present exemplary embodiment.

In exemplary embodiments 1 through 8, a description is primarily given to methods of reducing resistance at the cathode side of capacitor element stack body. In exemplary embodiments 9 through 15, a description is primarily given to methods of reducing resistance at the anode side of capacitor element stack body. By combining these methods together, equivalent series resistance characteristics closest to the ones of the most ideal capacitor are allowed to be realized.

What is claimed is:

1. A solid electrolytic capacitor comprising:
    a capacitor element stack body formed by stacking a plurality of capacitor elements,
        wherein said each respective capacitor element has an anode member and a cathode member formed by dividing an anode body made of a valve action metal and is formed of a dielectric oxide film layer, a solid electrolyte layer and a cathode layer stacked on top of each other in layers in succession on a surface of said cathode member;
    an anode lead frame connected to said anode member of capacitor element stack body; and
    a cathode lead frame provided with a connecting member to connect integrally with said cathode member of capacitor element stack body on a side surface of said capacitor element extending in a thickness direction thereof.

2. The solid electrolytic capacitor according to claim 1, wherein said connecting member is formed by bending at least part of said cathode lead frame.

3. The solid electrolytic capacitor according to claim 1, wherein at least part of said cathode lead frame is disposed between stack layers of cathode member of said capacitor element stack body.

4. The solid electrolytic capacitor according to claim 1, wherein
    said cathode lead frame further comprises a flat member to dispose said cathode member of capacitor element stack body thereon, and
    said connecting member is formed by bending two ends of said flat member upward and downward, respectively.

5. The solid electrolytic capacitor according to claim 1, wherein said cathode lead frame is further provided with a holding member to hold both upper and bottom surfaces of said capacitor element stack body, respectively.

6. The solid electrolytic capacitor according to claim 1, wherein said connecting member connects integrally with said cathode member of capacitor element stack body on a side surface of said capacitor element extending in a thickness direction thereof and located at a side opposite to said anode member of capacitor element stack body.

7. The solid electrolytic capacitor according to claim 1, wherein
    said cathode lead frame further comprises a flat member to have said cathode member of capacitor element stack body disposed thereon, and
    said connecting member is formed by bending two opposite ends of said flat member upwards to be facing each other.

8. The solid electrolytic capacitor according to claim 7, wherein said connecting member further comprises a member to connect integrally with said cathode member of capacitor element stack body on a side surface of said capacitor element extending in a thickness direction thereof, said side surface being located at a side opposite to said anode member of capacitor element stack body.

9. The solid electrolytic capacitor according to claim 1, wherein said cathode lead frame further comprises a pair of guiding members to guide said cathode member of capacitor element stack body.

10. The solid electrolytic capacitor according to claim 8, further comprising a pair of guiding members formed by bending two opposite ends of said connecting member to guide said cathode member of capacitor element stack body.

11. A solid electrolytic capacitor comprising:
    a capacitor element stack body formed by stacking a plurality of capacitor elements,
        wherein said each respective capacitor element has an anode member and a cathode member formed by dividing an anode body made of a valve action metal, and is formed of a dielectric oxide film layer, a solid electrolyte layer and a cathode layer stacked on top of each other in layers in succession on a surface of said cathode member, and is provided with a through hole on said anode member;
    an anode lead frame connected to said anode member of capacitor element stack body; and
    a cathode lead frame connected to said cathode member of capacitor element stack body.

12. The solid electrolytic capacitor according to claim 11, wherein a spacer is provided between said respective anode members of capacitor element stack body.

13. The solid electrolytic capacitor according to claim 11, wherein said spacer is provided with a recessed area to have said anode member of capacitor element fit therein.

14. The solid electrolytic capacitor according to claim 11, wherein said spacer is folded back at places excluding an area where said anode member of capacitor element and said spacer are brought into contact with each other.

15. The solid electrolytic capacitor according to claim 11, wherein said spacer is provided with a through hole, said through hole being located at a position corresponding to a place where said through hole provided on said anode member of capacitor element is located.

16. The solid electrolytic capacitor according to claim 11, wherein said respective anode members of capacitor element stack body are joined with one another by resistance welding via said through holes provided on said respective anode members.

17. The solid electrolytic capacitor according to claim 11, wherein said respective anode members of capacitor element stack body are joined with one another via a rivet inserted in said through holes provided on said respective anode members.

18. The solid electrolytic capacitor according to claim 11, wherein said respective anode members of capacitor element stack body are joined with one another via a conductive adhesive filled in said through holes provided on said respective anode members.

19. The solid electrolytic capacitor according to claim 12, wherein said spacer and said each respective anode member of capacitor element stack body are swaged to be joined together.

20. The solid electrolytic capacitor according to claim 11, wherein said cathode lead frame is provided with a connecting member to connect integrally with said cathode member of capacitor element stack body on a side surface of said capacitor element extending in a thickness direction thereof.

21. A manufacturing method of solid electrolytic capacitors comprising the steps of:

dividing an anode body made of a valve action metal into an anode member and a cathode member and preparing a capacitor element by stacking on a surface of said cathode member a dielectric oxide film layer, a solid electrolyte layer and a cathode layer on top of each other in layers in succession;

stacking a plurality of said capacitor elements on top of each other in layers on each of one surface of respective anode lead frames and cathode lead frames formed continuously on a hoop at positions with a predetermined spacing provided therebetween and joining said anode member to said anode lead frame;

joining said cathode member of capacitor element to said cathode lead frame via a conductive adhesive; and forming a capacitor element stack body by stacking a plurality of said capacitor elements on top of each other in layers on another surface of respective anode lead frames and cathode lead frames by turning said hoop upside down and joining said capacitor elements together.

* * * * *